(12) United States Patent
Narushima

(10) Patent No.: US 6,710,892 B2
(45) Date of Patent: *Mar. 23, 2004

(54) SYSTEM AND METHOD FOR PRINTING IMAGE DATA IN A REDUCED TIME

(75) Inventor: Toshio Narushima, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,265

(22) Filed: Jul. 13, 1999

(65) Prior Publication Data

US 2003/0016376 A1 Jan. 23, 2003

(30) Foreign Application Priority Data

Jul. 15, 1998 (JP) ............................................ 10-200714

(51) Int. Cl.7 ............................ G06F 3/12; G06F 13/00
(52) U.S. Cl. ...................................... 358/1.13; 358/452
(58) Field of Search ............................. 358/1.13, 1.16, 358/1.15, 537, 538, 1.14, 1.18, 452; 355/78, 84; 382/282–287, 309, 311

(56) References Cited

U.S. PATENT DOCUMENTS

| 5,576,847 A | * | 11/1996 | Sekine et al. ................ 358/448 |
| 6,147,704 A | * | 11/2000 | Ito et al. ...................... 348/222 |
| 6,172,762 B1 | * | 1/2001 | Uchiyama ................... 358/1.14 |
| 6,295,133 B1 | * | 9/2001 | Bloomquist et al. ......... 358/1.1 |

* cited by examiner

*Primary Examiner*—Gabriel Garcia
*Assistant Examiner*—Douglas Tran
(74) *Attorney, Agent, or Firm*—Frommer Lawrence & Haug LLP; William S. Frommer; Dennis M. Smid

(57) ABSTRACT

A printer system is provided which comprises an image data input to convert a data or signal to a digital image data, a data processor for edition process of the digital image data, a printout processor to convert the digital image data to a print data, an image printer to print an image and a human interface to control the above components based on an external instruction. The human interface allows the printout processor to start a printout process before a printout process instruction is given to the image printer, and cancel the printout process if an edition process instruction is given to the data processor in the middle of the printout process in the printout processor.

16 Claims, 18 Drawing Sheets

SYSTEM AND METHOD FOR PRINTING IMAGE DATA IN A REDUCED TIME

BACKGROUND OF THE INVENTION

1. Field of the Invention

The present invention relates to a printing method and printer system, and more particularly, to a printing method and printer system, adapted to print an image on a recording medium in a reduced time.

2. Description of Related Art

Conventionally, to print an image data represented by a natural image, any of the following two typical printing methods is used frequently:

In a first one of such printing methods, various input devices each for input of an image data are connected to a general-purpose computer to which a printer is connected, the image data is supplied from the input devices to the computer where they are subjected to various edition processes to provide a data to be printed (will be referred to as "print data" hereinunder) which is supplied to the printer which will print it. The input devices include a removable medium drive being a recording/reproducing apparatus for removable media, an NTSC (National Television System Committee) video signal input board, a silver film scanner, a digital still camera, etc.

In a second printing method, various input devices such as a digital still camera and original scanner are connected directly to a printer, not via a computer, and print data is supplied from the input devices to the printer which will print out the data.

The first method will further be described below:

Referring now to FIG. 1, there is schematically illustrated the first example of conventional image data printing method. As shown, the printer system carrying out this first method of image data printing comprises mainly a host computer (will be referred to simply as "computer" hereinunder) 1001, a printer 1002 and an input device 1003.

The input device 1003 may be any one of the aforementioned removable media (read-only optical disc such as a so-called CD-ROM and rewritable magneto-optical disc such as a so-called MD-DATA, etc.) drives, video signal (NTSC, PAL (=Phase Alternation by Line), RGB, S-terminal signal, etc.) input devices, digital still camera, silver film (35 mm film, so-called APS film carrying also information associated with an image, etc.) scanners, manuscript scanners, etc.

As shown, the printer 1002 may be any one comprising a print head 1004 which actually prints and a head drive circuit 1005 which drives the print head 1004.

As shown, the computer 1001 may be a one comprising an interface 1006 for input of an image data from the input device 1003 to the computer 1001, a data processor 1007 for processing the image data to provide a print data, and a two-way printer interface 1008 for output of the print data from the data processor 1007 to the printer 1002. The data processor 1007 is provided with a device driver compatible with the input devices 1003 of various types to control the latter, a printer driver compatible with the printer 1002 to control the latter, and also an application software for control of input, processing and printout of an image data. The application software uses the data processor 1007 to process the data.

The computer 1001 is further provided with a display device 1009 as a man-machine interface, and a pointing device 1010 as a mouse, keyboard or the like by which an external instruction is supplied to the computer 1001. Moreover, the computer 1001 is provided with an image memory 1011 such as a hard disc to store image data supplied from the input device 1003.

The input device 1003 is connected to the interface 1006 in the computer 1001, and the two-way printer interface 1008 in the computer 1001 is connected to the printer 1002. Thus the input device 1003 is indirectly connected to the printer 1002.

For actual printing, the following operations are effected:

That is, when the application software in the computer 1001 and the device driver corresponding to the image data input device 1003 is put into run, the input device 1003 is driven via the image data input interface 1006 to read image data under the control of the computer 1001. The image data is supplied to the computer 1001 via the interface 1006.

Next, according to an external instruction supplied from the pointing device 1010, the application software in the data processor 1007 edits and processes the image data supplied to the computer 1001, as desired by the user. If the image data processing is also done at this time, the data is processed as necessary through calculation by the data processor 1007 in the computer 1001.

Thus the image data is subjected to an edition process designated by the user. When an image to be printed is thus determined, the printing operation is started. More particularly, when the user determines an image to be printed or selects a printing operation to given an instruction for starting the printing operation, the application software will control the printer driver and each data processing for printing in the data processor 1007, and convert the image data to a print data which can be delivered as an output to the printer 1002. At this time, the computer 1001 detects the status of the printer 1002 via the two-way printer interface 1008.

The print data thus generated through the conversion is configured as a printer control instruction and it is sent to the printer 1002 via the two-way printer interface 1008. Next, based on the print data included in the received printer control instruction, the head drive circuit 1005 in the printer 1002 drives the print head 1004 which will thus print out an image on a recording medium.

More specifically, an image data is processed as will be described below with reference to a circuit diagram in FIG. 2 showing a data flow in the conventional image data printing method in FIG. 1. Note that a slash marked on a line indicative of a data flow in FIG. 2 means that the data transmitted over the line is an 8-bit/color data. An RGB image data supplied to an image data input 1012 in the computer 1001 is sent to an image data processor 1013 where it will be processed as necessary. At this time, the data is held as an image file 1011a in the image memory 1011 as necessary. The RGB image data is sent from the image data processor 1013 to a printer driver 1014 which controls the printer 1002.

As shown in FIG. 2, main components of the printer driver 1014 are an RGB-CMY converter 1015 to convert the RGB image data to a CMY print data, a color correction circuit 1016 to correct the color as necessary, a black extraction/background color removal circuit 1017 to extract black in addition to CMY, an output gamma correction/gradation correction circuit 1018 to correct a characteristic peculiar to the printer, and a sharpness correction circuit 1019 which effects an edge enhancement, etc.

More particularly, RGB image data sent from the image data processor 1013 to the printer driver 1014 is first converted to CMY print data. After corrected in color, the CMY print data is converted to a print data including black as well (the black print data is indicated with a reference K in FIG. 2), corrected concerning a characteristic peculiar to the printer 1002, edge-enhanced and then sent to the printer 1002. At this time, in case a binary printer to reproduce an image based on whether a print dot exists or not, such as an ink jet printer, is used as the printer 1002, a binary coder has to be additionally provided downstream of the sharpness correction circuit 1019 of the printer driver 1014. However, in case a sublimation type printer to represent a gradation within print dots, or the like is used as the printer 1002, the binary coder is not necessary.

The printer 1002 incorporates an output characteristic converter 1020 which corrects output characteristic according to the status of the printer 1002 and suppresses a printer-caused nonuniformity, and also the head rive circuit 1005 and print head 1004.

Therefore, the CMYK print data sent from the printer driver 1014 to the printer 1002 is passed sequentially through the output characteristic converter 1020 to the head drive circuit 1005 and print head 1004 for printing.

Next, the second method will be described herebelow with reference to FIG. 3 schematically illustrating the second example of conventional image data printing method. As shown, the printer implementing the second method comprises mainly a digital still camera 1021 as an input device, and a printer 1022.

The digital still camera 1021 comprises mainly an image pickup device 1023 to acquire an image of an object, a pointing device 1024 for input of an external instruction such as a shutter or the like, an image memory 1025 for temporary storage of the acquired image, an image data processor 1026 to process data of the acquired image as necessary, and a display device 1027 to display the image.

The printer 1022 comprises mainly an output characteristic conversion circuit 1028 to correct output characteristic according to the status of the printer 1022, a head drive circuit 1029 to drive a print head 1030, and the print head 1030 to actually print the image.

For data transfer from the digital still camera 1021 to the printer 1022, the camera 1021 and printer 1022 may be connected to each other via a wire circuit, image data produced by the digital still camera 1021 be converted to a print data for transfer as a digital signal, or converted to an analog video signal for transfer, to the printer 1022 via a wire circuit. Alternatively, Ir-DA or the like may be used to transfer the image data via a wireless circuit from the digital still camera 1021 to the printer 1022.

For actual printing, the following operations are effected:

A signal of acquired image of an object has already been supplied from the image pickup 1023 to the digital still camera 1021 during the preparation for the imaging, namely, before the user presses the shutter of the digital still camera 1021 to start the imaging, and the image data processor 1026 has corrected the characteristic and imaging conditions of the image pickup 1023 for the image signal. The image thus corrected is displayed on the display device 1027 and so the user can check the coverage and positioning of the object. For such checking, the user may use an optical finder, if any, of the digital still camera 1021 in lieu of the display device 1027.

Next, when the user operates the pointing device 1024 such as a shutter, an imaging is stared. When an imaging start instruction is thus given, an image data supplied from the image pickup 1023 and corrected concerning the characteristic and imaging conditions of the image pickup 1023 is stored into the image memory 1025. The image data is compressed as necessary for storage into the image memory 1025 The compression may be done by the image data processor 1026.

For printing an image stored in the image memory 1025, the user operates the pointing device 1024 such as a key to start the printing operation. Then, the image data processor 1026 reads a predetermined image data from the image memory 1025, and converts it for output to the printer 1022 by expanding it as necessary.

Depending upon the mode of the interface between the digital still camera 1021 and printer 1022, the image data is transferred as a digital image data or analog video signal to the printer 1022 via a wire or wireless circuit.

At the printer 1022, the output characteristic conversion circuit 1028 corrects and converts the image data according to the printout conditions to provide a data based on which the print head 1030 is driven by the head drive circuit 1029 to print an image on a recording medium.

The user can edit, process or synthesize an image data by using the pointing device 1024 to give a instruction to the image data processor 1026 in the digital still camera 1021 while checking the image displayed on the display device 1027 to select a desired one of the processes The image data processing will be effected in the digital still camera 1021.

The above-mentioned image data processing may be done as will further be described with reference to FIG. 4, for example, which is a circuit diagram showing the flow of data in the conventional image data printing method. Note that a slash marked on a line indicative of the data flow in FIG. 4 means that the data transmitted over the line is an 8-bit/color data. RGB image data acquired by the image pickup 1023 of the digital still camera 1021 is sent to the image data processor 1026 where it will be processed as necessary. At this time, the image data is held in the image memory 1025 as necessary. Thereafter, the RGB image data is sent from the image data processor 1026 to the printer 1022 via the image data output 1031.

The printer 1022 comprises an output characteristic conversion circuit 1028, head drive circuit 1029 and a print head 1030, and similar components to those of the printer driver 1014 shown in FIG. 2.

The printer 1022 further comprises an image data input 1032 to receive an image data from the digital still camera 1021, an RGB-CMY converter 1033 connected to the image data input 1032 to convert RGB image data to CMY print data, a color correction circuit 1034 to correct color as necessary, a black extraction/background color removal circuit 1035 to extract black in addition to CMY, an output gamma correction/gradation correction circuit 1036 to correct characteristics peculiar to the printer, and a sharpness correction circuit 1037 for edge enhancement, etc.

The RGB image data supplied to the image data input 1032 is first converted to CMY print data, corrected in color, then converted to a print data including black as well (the black print data is indicated with a reference K in FIG. 4), corrected in characteristics peculiar to the printer, edge-enhanced and sent to the output characteristic conversion circuit 1028. At this time, when a binary printer to reproduce the image based on whether a print dot exists or not, such as an ink jet printer, is used as the printer 1022, a binary coder has to be additionally provided downstream of the sharpness correction circuit 1037. In case a sublimation type printer to represent a gradation within print dots, for example, is used as the printer 1022, however, the binary coder is not necessary.

Therefore, the CMYK print data is passed sequentially through the output characteristic conversion circuit 1028 to the head drive circuit 1029 and print head 1030 which will print an image.

However, the aforementioned conventional printing methods are disadvantageous in the following respects:

First, the first method makes it necessary to use various peripheral devices and connect them to the computer, and incorporate into the computer a device driver compatible with the peripheral devices, which is very troublesome. Further, it is necessary to install an application software suitable for input, edition, process, synthesize, correct and print a desired image, and set the application software and device driver for the peripheral devices to be controllable by the application software, which is also very troublesome. Moreover, the peripheral devices which cannot be controlled by the application software have to be controlled by another application software capable of controlling the peripheral devices. In this case, the user has to handle the plurality of application software and transfer image data between them. This is very troublesome.

A so-called desktop type or tower type computer, if used as the computer, needs a large space for connection with the peripheral devices, and it is troublesome to operate the computer.

In the second conventional printing method, processes including image input, edition, processing, synthesis, correction and printing depend greatly upon the functions of the input devices and can only be achieved in a limited range. An input device of one type is greatly different in function an operating procedure from a one of the other type, so that not so many users can operate such different types of input device so easily. Currently, a silver film scanner cannot be used as the input device for this method, and thus the second method is required to be improved for printing of an image on a silver film. Further, the input device and printer are connected to each other in a one-to-one relation, so it is not possible to process image data from a plurality of input devices for printing.

Further, in both the first and second conventional printing methods, an input image data is subjected to any of edition processes including edition, processing, etc. as necessary, and the image data is not converted to a print data printable by the printer before the user gives an instruction for starting a printing operation after completion of the edition process. In the first method, an input image data is converted by the printer driver 1014 in the computer 1001, for example. On the other hand, in the second method, an input image data is sent from the digital still camera 1021, for example, to the printer 1022 where it will be converted to a print data by the RGB-CMY converter 1033, etc. Thereafter, the print data is corrected at the output characteristic conversion circuit 1028 of the output characteristic converter 1020 to match the characteristic peculiar to the head drive circuit in the printer 1002 (1022), and thereafter printed out by the print head 1004 (1030). Here the printing procedure is over.

That is, in these conventional printing methods, even after the user tries to a predetermined one of edition processes including edition, processing, synthesis, etc. of an image data, the image data subjected to the edition process will not be converted to a print data unless the user instructs to start a printing operation. During a period from completion of the edition process until the instruction to start the printing operation is given, the printer driver 1014 in the computer 1001 and output characteristic converter 1020 in the printer 1002 (in the first method), or the RGB-CMY converter 1033 and output characteristic conversion circuit 1028 of the printer 1022 (in the second method), which are to process the image data to be a print data, will not function but are in standby status. Namely, the processing capabilities of these components is not fully utilized.

When it is necessary for the user to give an instruction for an edition process by input of a parameter or the like, the user will take much time for giving a plurality of such edition process instructions. For such a long time, the components for processing image data and print data are in standby status and not in operation. Namely, the processing capabilities of these components are not fully utilized.

Since an image data is converted to a print data, corrected and printed only after the user instructs to start a printing operation, no printing will be done immediately after the user has made such an instruction. Much time is required until the printing is actually started.

SUMMARY OF THE INVENTION

Accordingly, the present invention has an object to overcome the above-mentioned drawbacks of the prior art by providing a printing method for printing an image in a reduced time, and a printer system capable of effecting various edition processes, requiring only a small space for installation, easy to operate and capable of printing an image in a reduced time.

The above object can be attained by providing a printing method including the steps of making input of an image data; effecting a printout process to convert to print data the input image data or a data obtained by effecting edition processes of the input image data; and printing out an image based on the print data; the method further comprising, according to the present invention, the steps of starting the printout process before a printout instruction is given; and canceling the printout process if an edition process instruction is given in the middle of the printout process.

According to another aspect of the present invention, the printing method should preferably be adapted so that the printout process for conversion of the image data derived from the edition process to a print data is started after a predetermined edition process of the image data is completed and before the printout instruction is given.

According to another aspect of the present invention, the printing method should preferably be adapted so that if the edition process instruction or printout instruction is not given within a predetermined time after completion of the input of image data, the printout process of the image data should preferably be started, while if no instruction for a next edition process or no printout instruction is given within a predetermined time after completion of the predetermined edition process of image data, the printout process of the image data derived from the predetermined edition process is started.

In this case, the printing method should preferably be adapted so that if an instruction for a next edition process is to change the predetermined input operation in the middle of the predetermined edition process and the next edition process instruction is not given within the predetermined time, namely, if no instruction for a next edition process is given within the predetermined time while a series of edition processes is being done, the printout process of the edited image data is started upon completion of the predetermined edition process, that is to say, in the middle of the edition process.

The above object can be attained also by providing a printer system in which the aforementioned printing method according to the present invention, is applied, comprising, according to the present invention, an image data input in which an external input digital image data and/or analog image signal is converted to a first digital image data by an analog/digital conversion; an edition processor to edit the first digital image data at least once to provide a second digital image data as an edited image data; a printout processor to make an edition process for conversion of the first or second digital image data to a print data which is printed out by an image printer; an image printer to print out an image on a recording medium based on the print data; and a controller to control, based on an external instruction, the edition processor, printout processor and the image printer.

According to another aspect of the present invention, the printer system should preferably be adapted so that the controller provides a printout process instruction to the printout processor, before giving a printout instruction to the printout processor, to allow the printout processor to start the printout process, and provides the printout processor with a printout process cancel instruction if it has provided an edition process instruction to the edition processor to cancel the printout process being done in the printout processor.

According to another aspect of the present invention, the printer system should preferably be adapted so that the controller provides the printout processor with a printout process instruction for conversion, to a print data, of the second digital image data edited by the predetermined edition process to allow the printout processor to start the printout process after completion of the predetermined edition process at the edition processor and before the controller provides a printout instruction to the image printer.

According to another aspect of the present invention, the printer system should preferably be adapted so that the controller provides the printout processor with a printout process instruction to allow the printout processor to start a printout process of the first digital image data when the controller has provided no edition process instruction to the edition processor, or when the controller has provided no printout instruction to the printout processor, within a predetermined time after completion of the conversion to the first digital image data in the image data input, and also should preferably provide the printout processor with a printout process instruction to allow the printout processor to start a printout process of the second digital image data edited by the predetermined edition process when the controller has provided no instruction for a next edition process to the edition processor, or when the controller has provided no printout instruction to the image printer, within a predetermined time after completion of the predetermined edition process in the edition processor.

In this case, the printer system should preferably be adapted so that if an instruction for a next edition process is to change the predetermined input operation in the middle of the predetermined edition process and the next edition process instruction is not given within the predetermined time, namely, if no next edition process instruction is given within the predetermined time while a series of edition processes is being done, the controller provides the printout processor with a printout process instruction to allow the printout processor to start the printout process of the edited image data upon completion of the predetermined edition process, that is to say, in the middle of the edition process of the second digital image data.

According to another aspect of the present invention, the printer system should preferably be adapted so that the controller controls the edition processor and printout processor in parallel with a priority given to the edition process instruction from the controller to the edition processor rather than to the printout process instruction from the controller to the printout processor.

In the printing method and printer system according to the present invention, a printout process is effected to convert an input image data or an image data obtained by edition of the input image data to a print data. When an image is printed out based on the print data, the printout process is started before a printout process instruction is given, or when an edition process instruction has been given in the middle of the printout process, the printout process is canceled.

More particularly, in the printing method and printer system according to the present invention, the user determines to print out an input image data or edited image data, so that before a printout instruction is given, conversion of the input image data or edited image data to the print data is started. Namely, when the user gives a printout instruction, at least a part of the input image data or edited image data has been converted to a print data. Therefore, the time taken since the printout instruction is given until the printout is done is considerably short as compared with the conventional printing method and printer system in which an image data is converted to a print data after the printing operation is started. In the printer system according to the present invention, the printout is done for the standby time in the conventional printer system, namely, the processing capability of the printer system is fully utilized.

In the printing method and printer system according to the present invention, since if an edition process instruction is given in the middle of a printout process, the printout process is canceled, so the printout process will not interfere with the edition process which will thus be done smoothly.

Especially in the printer system according to the present invention, the controller to control the edition processor, printout processor and image printer should preferably be adapted to control the edition processor and printout processor in parallel based on an external instruction with a priority given to instruction from the controller to the edition processor rather than to instruction from the controller to the printout processor, so the printout process will not interfere with the edition process which can thus be done smoothly based on an instruction from the user.

Further, the printing method and printer system according to the present invention should preferably be adapted so that if an edition process or printout instruction is not given within a predetermined time after completion of an input image data, the printout process of the image data is stared and that if an instruction for a next edition process or a printout instruction is not given within a predetermined time after completion of an input image data, the printout process of an image data edited by the edition process is started, whereby it is possible to prevent a printout process of no use as much as possible.

Moreover, the printing method and printer system according to the present invention should preferably be adapted so that if an instruction for a next edition process is to change an input operation in the middle of a predetermined edition process and the next edition process instruction is not given within a predetermined time, namely, if no next edition process instruction is given within a predetermined time in the middle of a series of edition processes being done, a printout process of edited image data is started upon termination of the edition process by the predetermined edition process, that is to say, in the middle of edition process, whereby the time taken since the printout instruction is given until an image is printed out is considerably shortened even when various edition processes are done.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

The printing method according to the present invention includes the steps of entering an image data; making a printout process to convert the input image data or a data obtained by edition of the input image data to a print data; and printing out an image based on the print data; and the printing method further comprises the steps of starting the printout process before a printout instruction is given; and canceling the printout process when an edition process instruction is given in the middle of the printout process.

Also, the printing method according to the present invention should preferably be adapted so that the printout process for conversion of the image data derived from the edition process to a print data is started after completion of predetermined edition process of the image data and before the printout instruction is given.

Further, the printing method according to the present invention should preferably be adapted so that if the edition process or printout instruction is not given within a predetermined time after completion of the input of image data, the printout process of the image data should preferably be started, while if the edition process or printout instruction is not given within a predetermined time after completion of the predetermined edition process of image data, the printout process of the image data derived from the predetermined edition process is started.

In this case, the printing method may be adapted so that if an instruction for a next edition process is to change the predetermined input operation in the middle of the predetermined edition process is and the next edition process instruction is not done within the predetermined time, namely, if no next edition process instruction is given within the predetermined time while a series of edition processes is being done, the printout process of the edited image data is started upon completion of the predetermined edition process, that is to say, in the middle of the edition process.

Figure 1:
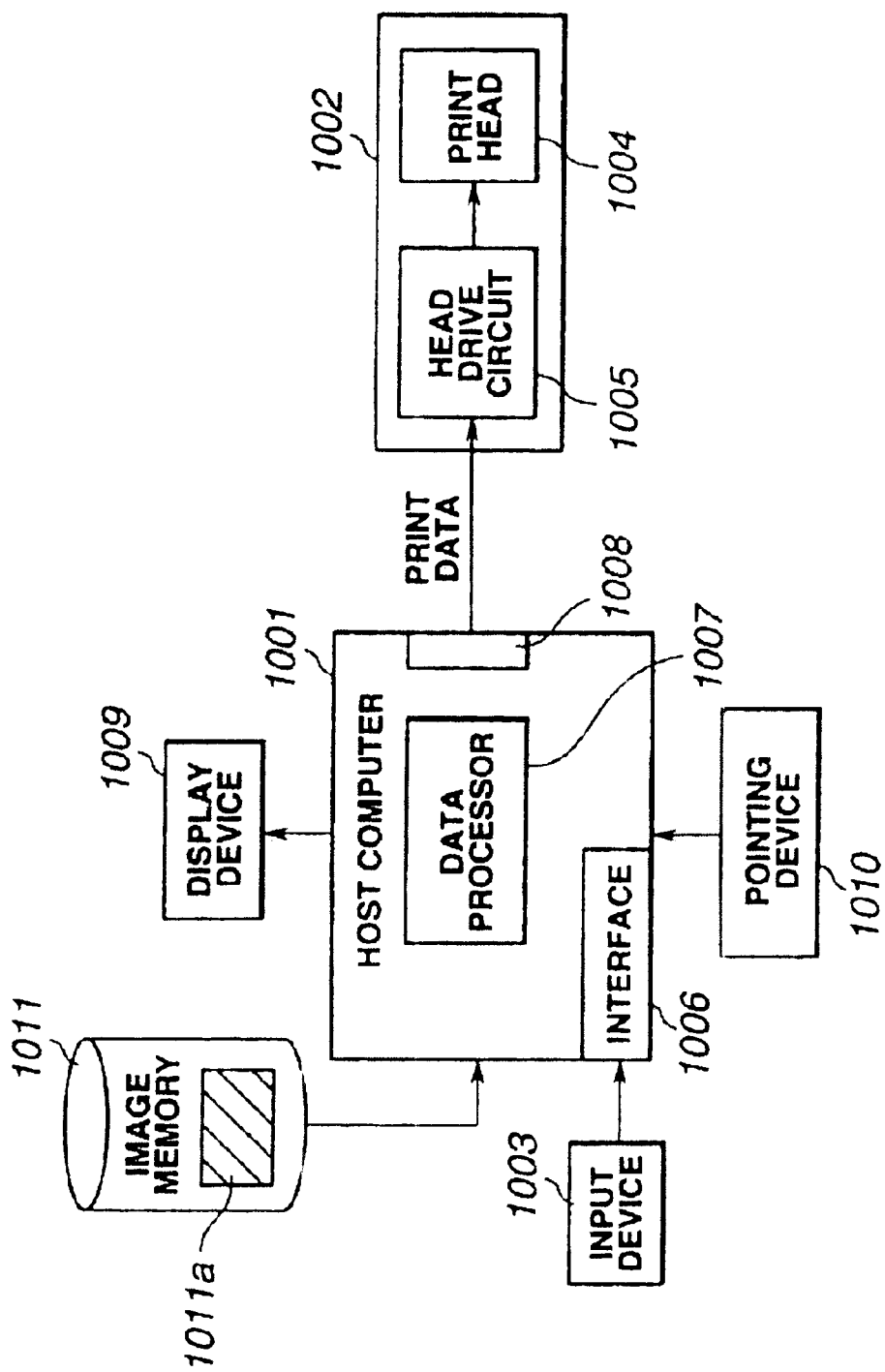
FIG. 1 is a schematic illustration of an example of conventional image data printing method.
Figure 2:
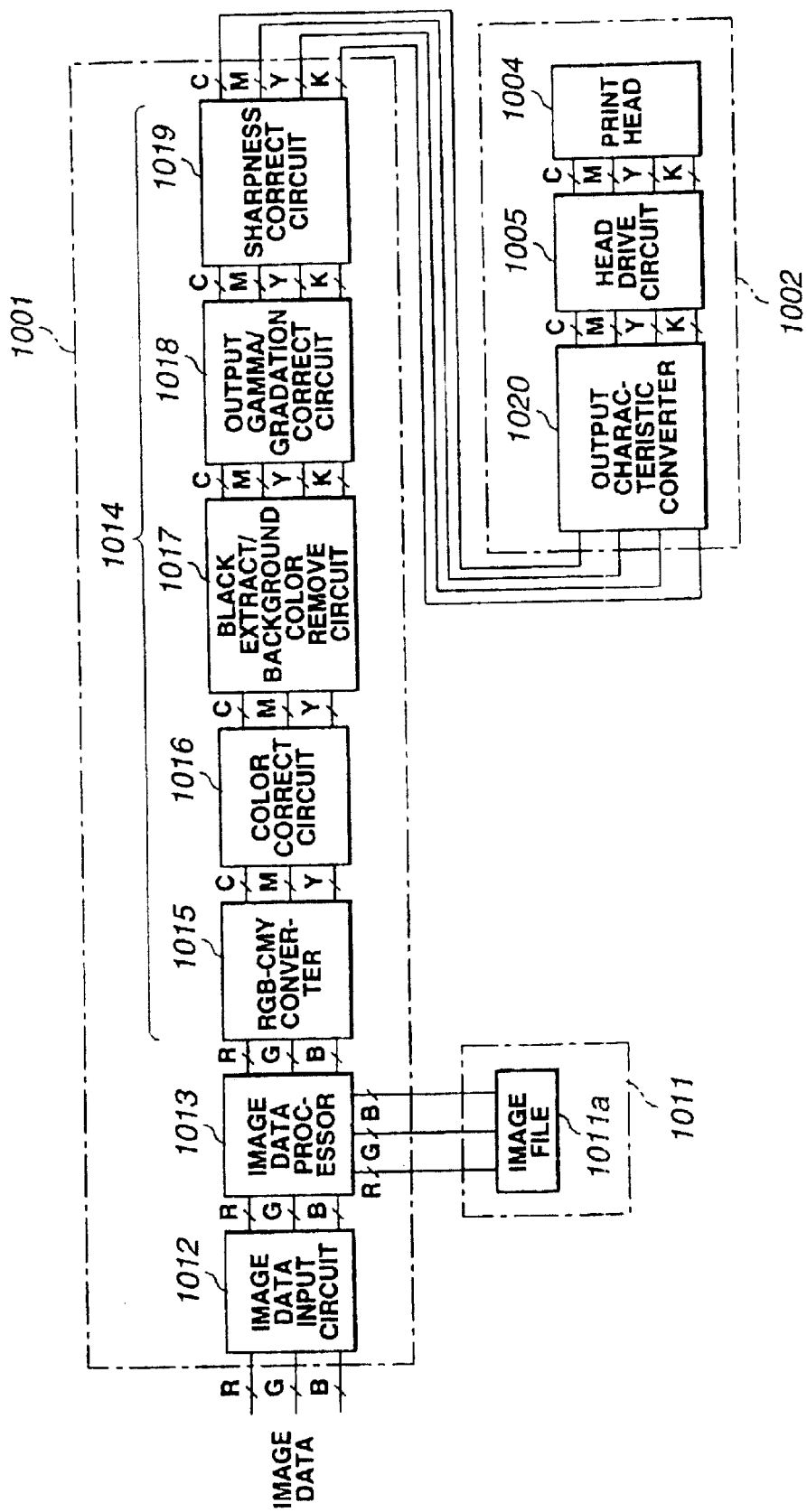
FIG. 2 is a circuit diagram showing the flow of data in the conventional image data printing method in FIG. 1.
Figure 3:
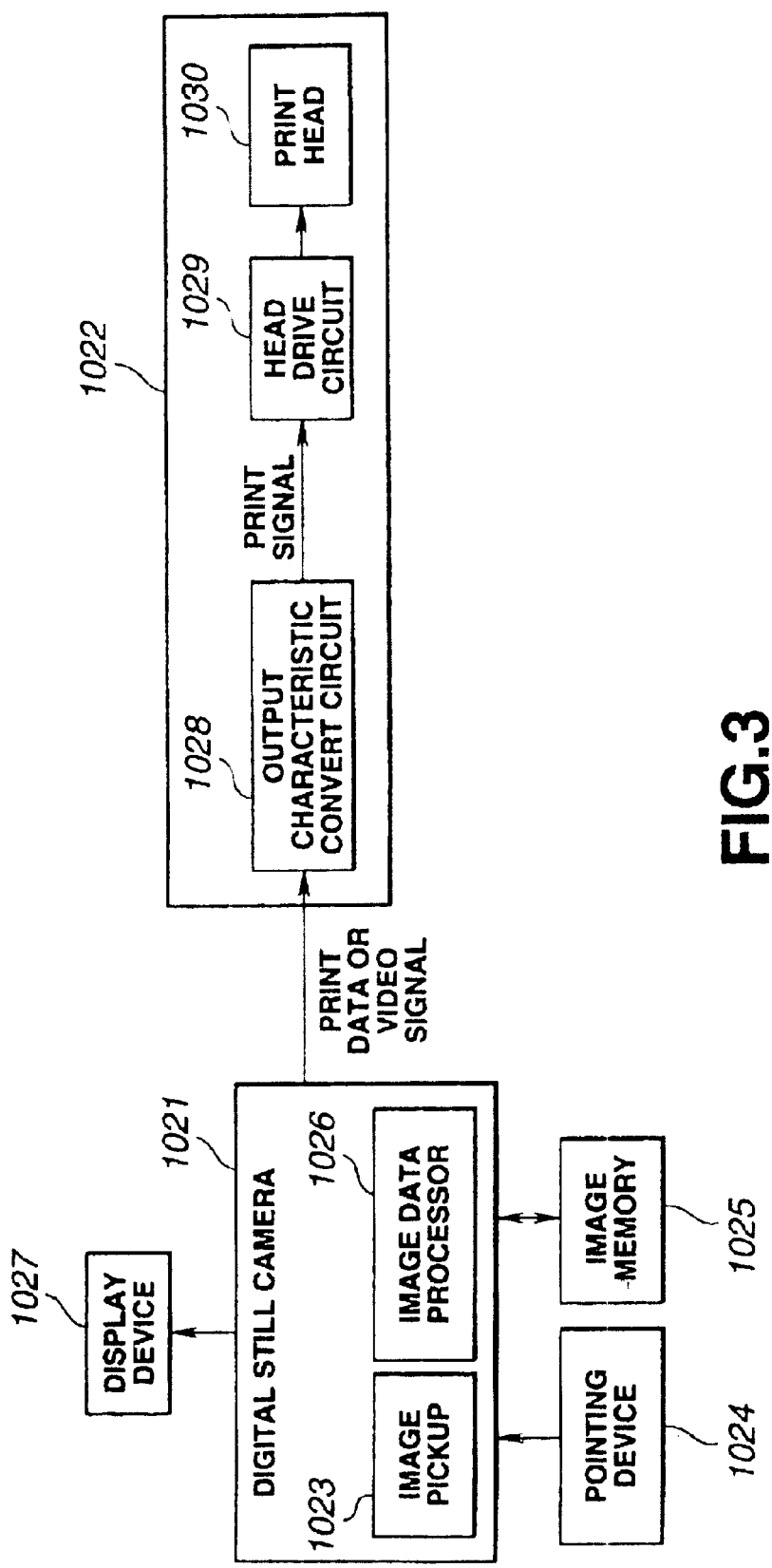
FIG. 3 is a schematic illustration of another example of conventional image data printing method.
Figure 4:
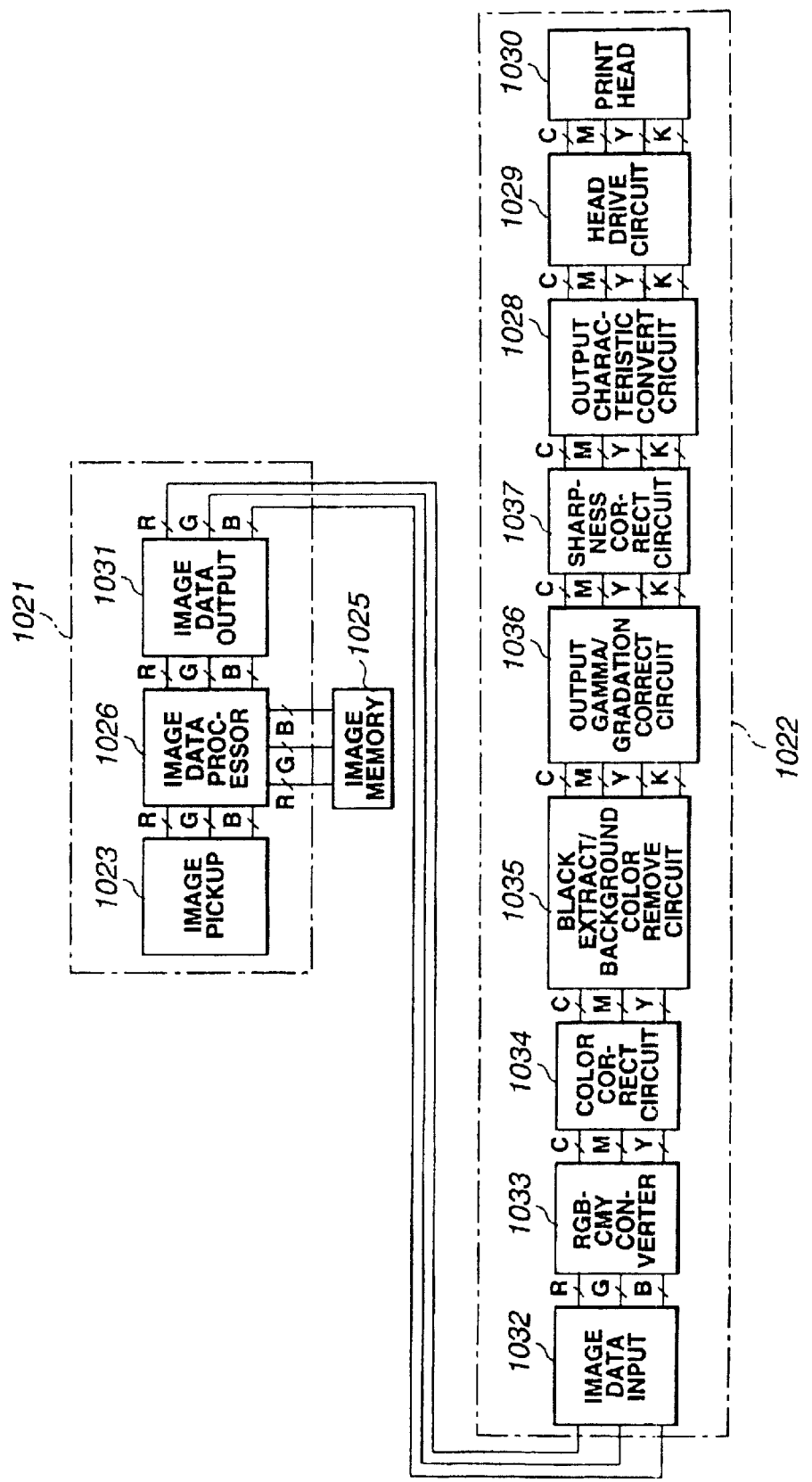
FIG. 4 is a circuit diagram showing the flow of data in the conventional image data printing method in FIG. 3.
Figure 5:
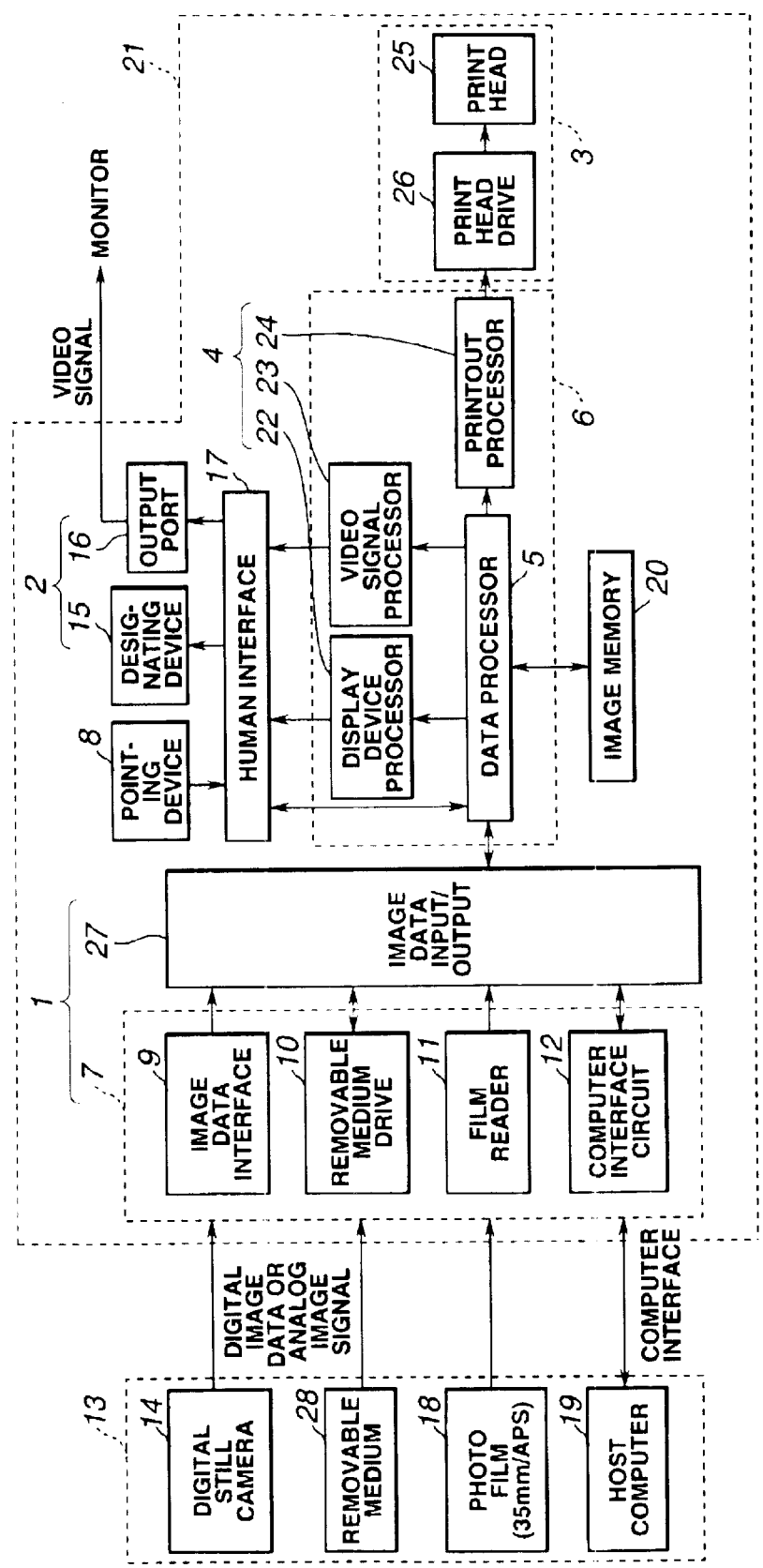
FIG. 5 is a schematic block diagram of a printer system according to the present invention.

Referring now to FIG. 5, there is schematically illustrated a printer system to which the aforementioned printing method according to the present invention is applied. As shown, the printer system comprises, as basic components, an image data input 1 in which a digital image data and/or analog image signal supplied from outside is converted to a first digital image data by an analog/digital conversion, a data processor 5 to edit the first digital image data into a second digital image data by at least one edition, a printout processor 24 for conversion of the first or second digital image data to a data to be printed out (will be referred to as "print data" hereinunder) by an image printer 3, and the image printer 3 to print out an image on a recording medium based on the print data. Further, the printer system comprises a human interface 17 to control the data processor 5, printout processor 24 and image printer 3 based on an external instruction. The human interface 17 is connected to the printout processor 24 via the data processor 54, and also to the image printer 3 via the printout processor 24, so that it controls these components. The data processor 5 is provided with an image memory 20.

The printer system of the present invention further comprises a pointing device as means for input of an external instruction.

Furthermore, according to the present invention, the printer system comprises means 7 for input of an analog image signal and/or digital image data to the image data input 1 to the image data input 1, and an image data input/output 27 provided between the image input means 7 and data processor 5 to connect them to each other.

Thus in the printer system of the present invention, the image input means 7 in the image data input 1 receives a digital image data and/or analog image signal, converts it to a first digital image data by an analog/digital conversion, and supplies the first digital image data to the data processor 5 via the image data input/output 27. At the data processor 5, the first digital image data is edited, processed, synthesized and corrected as necessary (these processes are called "edition process" herein) to provide a second digital image data. Next, the first and/or second digital image data is converted to a print data by a printout processor 24. The print data is delivered to the image printer 3 which will print out an image based on the print data.

At this time, in the printer system according to the present invention, the human interface 17 provides a printout process instruction to the printout processor 24 before providing a printout instruction to the image printer 3, to thereby allow the printout processor 24 to start a printout process. Further, if the human interface 17 has given an edition process instruction to the data processor 5 in the middle of the printout process in the printout processor 24, the human interface 17 will issue a printout process cancel instruction to the printout processor 24 to cancel the printout process being done.

More specifically, in the printer system according to the present invention, before the user decides to print out the first and/or second digital image data and gives a printout instruction to the image printer 3 by operating a pointing device 8, conversion of the first or second digital image data to a print data is started. Thus, when the user gives the printout instruction, at least a part of the first and/or second digital image data will have been converted to a print data or the printing operation will have arrived halfway in a printout process. Therefore, the time from the issuance of a printout instruction until the printing is considerably reduced as compared with that in the conventional printer system in which conversion of an image data to a print data is started after a printing operation is started. The time required for printing is remarkably shorter.

Also, a printout process will be done for a standby time in the conventional printer system, thus the processing capability of the printer system can fully be utilized.

Further, in the printer system according to the present invention, when an edition process instruction is given in the middle of a printout process, the printout process is canceled. So, the printout process will not interfere with the edition process which will thus be executed smoothly and also will shorten the time required for the whole processing.

Moreover, the printer system according to the present invention comprises an image display output 2 for display of the first and/or digital image data, and a characteristic correction circuit 4 consisting of a display device processor 22 for correction of a setting of display output characteristic which defines the display quality of the image display output 2 and/or for correction of a setting of printing characteristic which defines the print quality of the image printer 3 as will further be described layer, a video signal processor 23 and the aforementioned printout processor 24. In this printer system, the data processor 5 and characteristic correction circuit 4 form together an image processor 6 which is connected to the image display output 2 via the human interface 17. The image display output 2 is provided with a display device 15 and an output port 16 for connection to an external monitor. Thus, the human interface 17 will control the display device processor 22, video signal processor 23, display device 15 and output port 16.

That is, the printer system is also adapted so that under an instruction from the human interface 17, the first and/or second digital image data is processed in a predetermined manner by the display device processor 22 and displayed on the display device 15, and also processed in a predetermined manner by the video signal processor 23 and delivered at the output port 16.

In the printer system, the characteristic correction circuit 4 consisting of the display device processor 22, video signal processor 23 and printout processor 24 corrects a setting of display output characteristic which defines the display quality of the image display output 2, correspondingly to a setting of print characteristic which defines the print quality of the image printer 3, or corrects a setting of print characteristic which defines the print quality of the image printer 3 correspondingly to a setting of display output characteristic which defines the display quality of the image display output 2. As a result, an image displayed at the image display output 2 is represented as an image equal in visual quality to an image printed out by the image printer 3.

Next, individual components of the printer system according to the present invention will be described in detail herebelow:

In the printer system, the image input means 7 comprises an image data interface 9 acting as an analog image signal input port or digital image data input port, a removable medium drive 10 being a disc drive or memory drive, a film reader 11 being a scanner using a photoelectric transducer, and a computer interface circuit 12 acting as a digital image data input port.

The image data interface 9 is provided to provide a connection between the image data input/output 27 and the external input device 13 including apparatuses or devices which processes an image of an object or original such as the digital still camera 14, digital video camera, original scanner, etc. as shown in FIG. 5

Note that the aforementioned image data interface 9 functions as a physical connector, and also controls the external input device 13 connected thereto to acquire a digitized image data (namely, as a digital image data input port). The image data interface 9 may be connected to the external input device 13 by a wire circuit, infrared rays, electromagnetic wave, or a wireless circuit.

Also, the printer system may be adapted so that an analog video signal such as NTSC video signal, PAL video signal, RGB video signal or S-terminal video signal (the interface 9 works as an analog image signal input port in this case) is supplied to the image data interface 9 and digitized to provide an image data.

For reception of a continuous image such as a data from a digital video camera or analog video signal, namely, a dynamic image (time-varying image or image sequence), the printer system may be adapted so that it can be delivered as it is as a video signal to an external monitor connected to the display device 15 or output port 16 of the image display output 2 and a selected dynamic image can be taken as a digital still image data into the image data interface 9 under the control of the human interface 17 when the user operates the pointing device 8 to give an instruction for selection of a desired image.

The image data thus acquired is sent to the data processor 5 via the image data input/output 27. The image data may be sent sequentially in the acquired order, in blocks each of a predetermined data amount or as a complete image data.

The removable medium drive 10 drives the removable medium 17 shown as one of the external input device 13 in FIG. 5 to write or read an image data.

The removable medium 17 may be a magnetic card, magnetic disc, optical disc, magneto-optic disc or an IC memory card formed from a flash memory, ROM or RAM.

The removable medium drive 10 is also adapted to drive and control a medium which has to be driven by a physical mechanism.

The image data thus acquired is sent to the data processor 5 via the image data input/output 27. The image data may be sent sequentially in the acquired order, in blocks each of a predetermined data amount or as a complete image data.

Also, the printer system nay be adapted so that if a plurality of image data is contained in the medium, they are delivered sequentially as they is or as each of them is compressed as a video signal to a monitor connected to the display device 15 or output port 16 of the image display output 2, and when the user operate the pointing device to give an instruction for selection of a desired image, the removable medium drive 10 is controlled by the human interface 17 as will further be described later to sends a selected image data to the image data input/output 27 for a predetermined process of the image data at the data processor 5. On the contrary, an image data subjected to the predetermined process by the data processor 5 can be sent via the image data input/output 27 to the removable medium drive 10 where it is written, for storage, to the removable medium 17.

The film reader 11 is to read and convert to an image data a data contained in a photographic film 18 shown as one of the external input device 13 in FIG. 5 such as a so-called 35 mm film, APS (Advanced Photo System) film which carries an image-related magnetic information, large rolled-type film, sheet-type film.

More particularly, the film reader 11 comprises mainly a photoelectric transducer such as a CCD line sensor, photodiode, phototransistor, CCD image sensor or C-MOS image sensor to detect an image on the film, a photoelectric transducer drive, and a drive controller to drive and control the film so that a target image corresponds to the photoelectric transducer. The photoelectric transducer reads an image on the film and converts it to a digital image data.

The image data thus acquired is sent to the data processor 5 via the image data input/output 27. The image data may be sent sequentially in the acquired order, in blocks each of a predetermined data amount or as a complete image data.

The printer system may be adapted so that if a plurality of images is recorded in the film, each of the images read by the film reader 11 is delivered as it is, as compressed or as roughly read at middle pitches to a monitor connected to the display device 15 or output port 16 of the image display output 2; when the user operates the pointing device 8 to give an instruction for selection of a desired image, the human interface 17 controls the film reader 11 to send the selected image data to the image data input/output 27 for a predetermined process of the image data at the data processor 5. Note that when the image is read roughly, it will be read again at normal pitches.

Further the printer system may be adapted so that if a film in the film reader 11 is inclined with respect to a reading range of the photoelectric transducer or if an image is not optimally positioned in the film, the set position of the film or the reading position of the photoelectric transducer can automatically be corrected by an instruction from the user or a software under the control of the human interface 17 for retrying to read the image.

Note that the film reader 11 may be adapted to correct the characteristic of the photoelectric transducer and the characteristic of an illumination for the photoelectric transducing. However, if the processing for these kinds of correction can be digitally done, the data processor 5 may be adapted for such correction, not the film reader 11.

Especially for reading an APS film among the photographic films 18 by the photoelectric transducer, a magnetic head is also provided in the film reader 11 to read an exposure-related magnetic data recorded on the APS film while reading an image on the APS film. The magnetic data is displayed as an exposure data related to the image data on the image display output 2 under the control of the human interface 17 and used for data manipulation in the data processor 5. The magnetic data is stored along with the image data.

For printing an image from an aforementioned photographic film 18, the conventional printer system uses a genera-purpose computer. However, employment of the printer system according to the present invention enables an easier printing of an image from the photographic film 18, and so makes it unnecessary to use such a general-purpose computer.

The computer interface circuit 12 is provided to connect the host computer 19 shown as one of the external input device 13 in FIG. 5 and the image data input/output 27. It may be a standard, high speed interface such as Bi-Centronics, IEEE-1394, USB, SCSI or the like. The computer interface circuit 12 controls other interfaces and various protocols including command and response for two-way transmission and reception of an image data. The image data thus transmitted and received is handled in units of line, block or plane.

Conventionally, for printout of an image by a printer in a computer system, each printout process should be done at a printer driver in the computer system. In the printer system according to the present invention, however, since these kinds of printout process are effected by the data processor 5 and characteristic correction circuit 4, the printer driver in the host computer 19 shares only a considerably reduced part of the printout process. That is to say, the time taken by the host computer to effect the printout printing is reduced and thus the host computer 19 can immediately start an operation other than the printout process. Thus, the time for which the host computer 19 occupies the CPU can be made shorter.

The printer system according to the present invention may also be adapted so that image data from the variety of image input means 7 is subjected to various edition processes by the data processor 5 and the result is sent to the host computer 19 in which it is subjected to various edition processes under other software. The image data thus processed can be stored in the host computer 19.

In the foregoing, the four types of image input means 7 have been described but they are non-limitative ones. The image input means 7 may be ones required for the present invention and not departing from the scope of the present invention.

Next, the image data input/output 27 will further be described below. It controls the transfer of image data between the image input means 7 and the data processor 5 in the image processor 6. More specifically, the image data input/output 27 transfers to the data processor 5 a first digital image data obtained by analog/digital conversion of an external input digital image data and/or analog image signal.

The image data input/output 27 further has a function to control the timing of image data transfer between the data sources and the destination, namely, the data processor 5 to prevent conflict between image data from the various sources, that is, the various image input means. Further, the image data input/output 27 may be adapted to handle image data from the various image input means in a same manner.

The image data input/output 27 receives image data from the image data interface 9 and film reader 11 of the image input means 7, and sends and receives image data to and from the removable medium drive 10 and computer interface 12. That is, the image data input 1 enters and delivers image data. The timing of image data sending and receiving by the image data input 1 and selection of an image data are controlled under an instruction from the human interface 17 when in a user-defined mode, and under control of the data processor 5 when in an automatic mode.

Also, this embodiment of printer system of the present invention comprises as components of the image display output 2 the display device 15 and the output port 16 which serves as an analog image signal output portion and/or digital image data output port. The output portion 16 is connected to an external monitor.

The display device 15 comprises mainly a full-color display to display an image data and data related to the human interface 17, and its associated drive. The display device 15 should preferably be a flat-panel display such as a LCD display. Also, the display device 15 may be provided with more than one status indicator formed from LEDs to indicate a status of operation.

The pointing device 8 operated by the user to enter an external instruction may be a mouse, trackball, keyboard, or a touch panel or pen-touch input panel provided on the display device 15. The pointing device 8 is to enter a user's instruction under the control of the human interface 17. On the touch panel or pen-touch input panel provided on the display device 15, positions of operation keys provided thereon correspond to the positions of the corresponding operation key images displayed on the display device 15.

If there is a likelihood that keys chatter, an electric circuit and control software is used to prevent a malfunction due to such a chattering. The pointing device 8 may be used to enter a user's instruction by displaying an instruction accepting range on the display screen of an external monitor under the control of the human interface 17, moving into the instruction accepting range a pointer produced from a video signal output from the output port 16, displayed on the external monitor screen and indicating a position the pointing device 8 points to, and selecting the instruction accepting range while the pointer is being displayed on the external monitor screen.

The human interface 17 functions to deliver an image data output from the image processor 6 to the image display output 2 consisting of the display device 15 and output port 16, select an image and read an image data according to a user's input instruction from the pointing device 8, set parameters for edition, processing, synthesis and correction of image data in the image processor 6, make a setting for correction of a setting, by the characteristic correction circuit 4, of a display output characteristic which defines the display quality at the image display output 2 and/or for correction of a setting, by the characteristic correction circuit 4, of a print characteristic which defines the print quality at the image printer 3, make an instruction for printout, and printer system according to a user's instruction.

The human interface 17 mixes an image data processed by the image processor 6 and bound for the display device 15 and output port 16 of the image display output 2 with image signals of control keys, sliding control, menu screen, etc. and deliver a mixture to the display device 15 and from the output port 16 to an external monitor.

Therefore, a display on the display device 15 can be made different from a display on the external monitor. For example, the display device 15 may display an image data and an image synthesized by the human interface 17, and only an image signal may be delivered at the output port 16 to display on the image data on the external monitor. More particularly, a total printing range is displayed on the display device 15 while only a selected image data is displayed on the external monitor, for example.

The image processor 6 consists mainly of the data processor 5 and characteristic correction circuit 4 as having previously been described.

In the image processor 6, if an image data supplied from the image data input 1 has no ideal quality, the data processor 5 will correct the input image data to improve the quality of an image displayed on the display device 15 and external monitor and that of an image printed by the image printer 3.

The data processor 5 of the image processor 6 receives a user's instruction from th pointing device 8 via the human interface 17, and makes a predetermined edition, processing, synthesis, correction and conversion of the first digital image data from the image data input/output 27 based on the user's instruction, to provide a second digital image data.

The data processor 5 is also adapted to control access to the image memory 20 to or from which image data is written or read as necessary under the control of the data processor 5. Data for storage into the image memory 20 has been edited, processed, synthesized and corrected at the data processor 5. If there is information related to the image data, it will also be stored into the image memory 20.

Data stored in the image memory 20 include a compressed one, reversibly compressed one, irreversibly compressed one, etc. In which form a data is to be stored into the image memory 20 is determined depending upon whether the form is easy to handle at the image processor 6, whether deterioration of image quality due to repeated compression and decompression is allowed, number of image data storable in the image memory 20 and maximum capacity of thereof, speeds of read and write from and to the image memory 20, etc. When the processing speed, image quality deterioration, data handling, etc. are taken in consideration, it is preferable to store image data in an uncompressed form in the image memory 20. Further, the image memory 20 should preferably have only a storage capacity for several uncompressed image data. Also, a part of the image memory 20 may be used as an image data working memory in the middle of a process in the image processor 6.

For storage of an image data in a compressed form into the image memory 20 during access to an image data in the image memory 20, the image data is compressed in the data processor 5 before it is written into the image memory 20. Of course, a data to be read out will be expanded or decompressed at the data processor 5.

Since the data processor 5 controls also access to the image memory 20, when a conflict is likely to occur between writing an image data into the image memory 20 and reading from the image memory 20, a time-division access is done or either of the write and read is delayed to avoid the conflict. Address control of the image memory 20 can normally be effected by designing the image memory 20 to have a variable capacity in order to detect the effective capacity.

Further the data processor 5 may be adapted to digitally process each image data having not been subjected, at the image data interface 9 and film reader 11, to a correction process peculiar to each input at the time of pickup or reading.

In the data processor 5, image data is handled in a digital form. If each image data supplied from the image data input 1 and digitized is continuously processed while it is keeping a same number of bits for calculation of the data as in an input image data, the calculation precision will gradually be worse. Therefore, it is important for assurance of the quality of an image to be printed to prevent the degradation of the calculation precision as much as possible by increasing th number of bits in each data by 2 to 4 bits in the middle of a calculation.

When the user edits, processes, synthesizes and corrects the first digital image data supplied from the image data input 1, the image data is displayed at the image display output 2 based on an instruction from the pointing device 8 under the control of the human interface 17 so that the user can check a desired process.

When the user operates the pointing device 8 to give an edition process instruction, the human interface 17 provides an edition process instruction to the data processor 5 where the first digital image data is processed as the user desires to produce a second digital image data.

When the second digital image data is produced, it is displayed at the image display output 2.

The printout processor 24 effects a variety of conversion and correction of the image data for printout by the image printer 3, and sends the converted and corrected data to the image printer 3. Usually, the first digital image data or a second digital image data processed as necessary is an RGB signal of more than 8 bits for each color. However, since a print head 25 of the image printer 3 uses an ink in three CMY colors or four CMYK colors, the printout processor 24 converts the RGB signal to each of these colors, corrects a color deviation of printout due to the fact that the spectral sensitivity of each color ink or toner is not ideal, and corrects changes due to the recording ambient conditions such as print head 25, ink and toner and coloring characteristic of a recording medium.

In the printout processor 24, the order of the image data for transfer to the print head 25 is changed to an actual order of printing at the print head 25 before the image data is supplied to the image printer 3. Therefore, a buffer RAM for print data may be provided in the printout processor 24. Alternatively, for the data processor 5 to read the image data from the image memory 20, the reading address may be controlled to match an order of printing at the print head 25.

In this embodiment of the printer system according to the present invention, the second digital image data produced at the data processor 5 is sent to the printout processor 24 under a printout process instruction from the human interface 17 before a printout instruction is issued from the human interface 17 to the image printer 3, that is, before a printout instruction is issued from the user operating the pointing device 8, and thus a printout process is started.

This is also true when the data processor 5 has not effected any edition process. The first digital image data from the image data input 1 is displayed at the image display output 2 and sent to the printout processor 24 under a printout process instruction from the human interface 17 before a printout process instruction is issued from the human interface 17 to the image printer 3, namely, before a printout instruction is issued from the user operating the pointing device 8, and thus a printout process is started.

In the printer system according to the present invention, if an edition process instruction is issued by the user operating the pointing device 8 in the middle of a printout process in the printout processor 24, the human interface 17 will issue an edition process instruction to the data processor 5 while issuing a printout process cancel instruction to the printout processor 24 to cancel the printout process.

More specifically, in the printer system, if an edition process instruction to the data processor 5, or a printout instruction to the image printer 3, is not issued from the human interface 17 within a predetermined time after completion of the conversion to a first digital image data in the image data input 1, that is, if the predetermined time has passed with no edition process instruction or printout instruction given by the user while the first digital image data is being displayed at the image display output 2, the human interface 17 will issue a printout process instruction to the printout processor 24 to start a printout process of the first digital image data.

Also, if an instruction for a next edition process to the data processor 5, or a printout instruction to the image printer 3, is not issued from the human interface 17 within a predetermined time after completion of a predetermined edition process in the data processor 5, that is, if the predetermined time has passed with no instruction for a next edition process or printout instruction given by the user while a second digital image data produced by a predetermined edition process designated by the user is being displayed at the image display output 2, the human interface 17 will issue a printout process instruction to the printout processor 24 to start a printout process of the second digital image data edited by the predetermined edition process. Thus, useless printout process can be prevented as much as possible.

If the next edition process instruction si to change the predetermined input operation in the middle of the predetermined edition process and it is not issued from the human interface 17 to the data processor 5 within a predetermined time, namely, if the user has made an input of the predetermined edition process and the predetermined time has passed with no predetermined edition process set in the middle of the input operation, the human interface 17 will issue a printout process instruction to the printout processor 24 to start a printout process of the second digital image data at completion of the predetermined edition process. Thus, the time from issuance of the printout instruction until actual printing can considerably be reduced even when various edition processes are done.

The printer system should preferably comprise a timer or time counter to measure the aforementioned predetermined time.

More specifically, the human interface 17 should preferably be adapted to control the data processor 5 and printout processor 24 in parallel with priority given to the instruction from the human interface 17 to the data processor 5 rather than to that from the human interface 17 to the printout processor 24, so that a printout process being done in the printout processor 24 is canceled when an edition process instruction is issued.

Thus, the printout process will not interfere with any edition process, so that an edition process based on an instruction given by the user can be effected smoothly.

Furthermore, in the embodiment of printer system according to the present invention, the human interface 17 should preferably comprise an operation management circuit to control the data processor 5 and printout processor 24 to operate in parallel.

The operation management circuit should preferably be adapted to detect an edition process instruction issued from the human interface 17 to the data processor 5 and allow the human interface 17 to issue an edition process cancel instruction to the printout processor 24 when it is found that the printout processor 24 is in the middle of a printout process, to thereby cancel the printout process.

It should be noted that the edition processes including edition, processing, synthesis and correction effected by the image printer 6 may also be adapted to be a one to which a parameter used in each process and software for each process can be added later from the removable medium drive 10 and computer interface circuit 12 or a one which can be updated by the removable medium drive 10 and computer interface circuit 12. In this case, new functions can be added to the printer system.

Also, it is possible to store into the removable medium 17 via the image data input 1 an image data having been edited, processed, synthesized, corrected or converted in the image processor 6. An image data sent to the external host computer 19 via the computer interface circuit 12 can be handled in various manners under an image processing software and image handling software in the host computer 19.

The image processor 6 comprises the characteristic correction circuit 4 in addition to the data processor 5. The characteristic correction circuit 4 comprises the aforementioned display device processor 22, video signal processor 23 and printout processor 24.

The display device processor 22 corrects the first digital image data or second digital image data processed as necessary according to the characteristic of the display device 15 to display the first or second digital image data on the display device 15 via the human interface 17.

The video signal processor 23 corrects the first digital image data or second digital image data processed as necessary according to the characteristics of external display equipment such as external monitor, etc., namely, according to the characteristic of a standard video signal delivered to the display equipment to display the first or second digital image data on the display equipment via the human interface 17.

An image data supplied from the display device processor 22 and video signal processor 23 to the human interface 17 is synthesized with other data in the human interface 17, and a synthesized image data is displayed on the display device 15 and external monitor as the case may be. In many cases, the other data includes a display and character which should be designated by the user, and a pattern generated by the data processor 5.

The printout processor 24 is as having been described in the above.

The embodiment of printer system according to the present invention may be adapted so that an image displayed at the image display output 2 and image printed by the image printer 3 can be corrected by the characteristic correction circuit 4 to have a visually same quality.

In the printer system, a setting of display characteristic which defines the quality of a display at the image display output 2 is corrected by the display device processor 22 and/or video signal processor 23 correspondingly to a setting of print characteristic which defines the quality of a print at the image printer 3. Otherwise, the setting of print characteristic which defines the quality of a print at the image printer 3 is corrected by the printout processor 24 correspondingly to the setting of display characteristic which defines the quality of a display at the image display output 2.

To determine what and how to process, processing sequence and parameter settings for the input characteristic conversion and correction process, display output characteristic conversion and correction process and print characteristic conversion and correction process, the display output characteristic setting conversion and correction process which defines the display quality is set and changed correspondingly to a print characteristic setting which defines the print quality, and the display output characteristic setting conversion and correction process which defines the display quality is set and changed correspondingly to a change of the print characteristic setting. The print characteristic setting conversion and correction process which defines the quality of print at the image printer is set and changed correspondingly to a display output characteristic setting which defines the display quality, and the print characteristic setting conversion and correction process which defines the quality of print at the image printer is set and changed correspondingly to a change of the display output characteristic setting which defines the display quality.

By setting and changing the display output and print characteristics in connection with each other, the display device characteristic can be set correspondingly to the print gamma characteristic, for example. By setting the display color reproduction characteristic correspondingly to the print color reproduction characteristic, it is possible for the user (viewer) to recognize that an image displayed on the display device 15 or an external monitor and an image printed on a recording medium are visually equivalent in quality to each other. Even when the display output characteristic or print characteristic is changed due to replacement and time change of the elements used, change of one of the characteristics allows the other to be changed correspondingly. With the input characteristic of an image data as well taken in consideration, the print characteristic conversion and correction process which affects the print quality and/or the display output characteristic conversion and correction process which affects the display output quality can be set and changed correspondingly to an input characteristic image correction process which affects the image data quality to keep the display output characteristic and print characteristic optimum for processing even when the image input means 7 is changed to a one having a different input characteristic, so that the user (viewer) can always recognize that an image displayed on the display device 15 or external monitor and an image printed on a recording medium are visually equivalent in quality to each other.

Such a changeable setting should preferably be such that it can be entered from an external input means such as pointing device 8, it can be entered at shipment from factory correspondingly to each characteristic and that it can be re-entered when the characteristic has changed considerably after the shipment.

The print characteristic setting of the image printer 3 and display output characteristic setting of the image display output 2 should preferably be selectable from a plurality of kinds previously set.

Next, the image printer 3 will be described herebelow. It consists of a print head drive 26 and print head 25. When the user gives an instruction for a predetermined image printout by using the pointing device 8, a printout instruction is issued from the human interface 17 to the image printer 3. At this time, in the printer system, the first or second digital image data is being at least partially converted and corrected (for the purpose of printing) in the printout processor 24 in the image processor 6, or it has already been converted to a print data. When the printout process has already been completed, the print data thus obtained is sent to the print head drive 26. If the printout process has not yet been completed, print data, having been generated in a sufficient amount to be printable by the print head 25, are sent to the print head drive 26.

In the printer system according to the present invention, when the user gives a printout instruction, the first or second digital image data is being at least partially converted or corrected (for the purpose of printing) or it has already been converted to a print data. In comparison with the previously described conventional printer system in which conversion of an image data to a print data is started after a printing operation is started, the time from issuance of a printout instruction until the printing is actually done is considerably shorter. In the printer system according to the present invention, the printout process is done for the standby time in the conventional printer system. Thus the processing capability of the printer system according to the present invention can be fully utilized.

Also, the print head drive 26 is adapted to operate, at a time when the print head 25 is driven, and convert the print data to a sufficient drive voltage, drive current and drive waveform to drive the print head 25 and proves them to the print head 25.

More particularly, the print head drive 26 operates synchronously with the operation of the printing mechanism for printing by the print head 25, movement of the print head, movement of the recording medium, maintenance of the print head, ink supply, etc. Also, for optimum printing in printing environmental conditions, an analog electric circuit is used as the case may be to correct image data based on an input from a detector element such as thermosensor. The correction, if it can digitally be conducted, may be effected in the printout processor 24 of the image processor 6. The print head drive 26 is configured and works according to the type of the print head used and number of print heads, and configuration of the printing mechanism.

The print head 25 prints an image by jetting a recording ink onto a recording medium or applying a recording toner to the recording medium. The print head may be an ink jet print head known from the disclosure of the Japanese Provisional Patent Application Publication No. 164656/95 or No. 336990/96, a recording material jet type print head, two-component mixing type print head, dye diffusion type thermal head, image forming head of laser beam printer or any recording head of any other type.

Among them, the recording material jet type print head and two-component mixing type print head, which can provide a full-color and half-tone recording should preferably be used since it can attain a high quality of full-color printing. Also, the print head may be a line print head and serial print head, which however depends upon the width of the print head. In the line print head, the printing time can be reduced since the recording medium has to be moved only in one direction relative to the head. In the serial print head, the recording medium and head have to be moved in two directions in relation to each other.

In the foregoing, the printer system according to the present invention has been described concerning a main unit 21 synthesized integrally of the image input means 7, image data input/output 27, image processor 6, image memory 20, pointing device 8, image display output 2 and the image printer 3. However, the image input means 7 may be provided separately from the main unit 21 of the printer system. In this case, the film reader 11 may be connected to the main unit 21 by a two-way interface, for example. The two-way interface will provide same bidirectional transmission and reception of signal from the photoelectric transducer, control signal from the reading mechanism, etc. between the image input means 7 and main unit 21 as those when the film reader 11 is incorporated in the main unit. The two-way interface may be a general-purpose interface as specified in IEEE-1394. Also, by using the general-purpose interface to connect any other image input means 7 in place of the film reader 11 and adapting the software for communication between the image input means 7 and main unit 21, an image data can be transmitted between the other image input means 7 and main unit 21 via the interface.

If it is possible to dispose the image input means 7 separately from the main unit 21, only necessary ones of the image input means 7 can be connected to the main unit 21, thus the printer system can be designed compact and the space for installation of the printer system will be smaller.

The display device 15 is incorporated in the main unit 21 but it should preferably be movable inside the main unit 21. For example, the display device 21 should preferably be held over the box-like main unit 21 by means of a support to be rotatable or otherwise movable within a predetermined range for easy viewing from the user. The display device 15 may be disposed separately from the main unit 21. It should preferably have a physical or electrical coupling by which it can be connected to the main unit 21, so that the user can view the display device 15 from a remote place. That is, the image characteristics such as color of a displayed image on the display device 15 are easily affected by the ambient conditions. However, by disposing the display device 15 movably on the main unit 21 or separately from the main unit 21, the user can view the display device 15 with the image characteristics not affectable by the ambient conditions.

The pointing device 15 may be disposed separately from the main unit 21, which will permit the user to remotely printer system.

The printer system constructed as having been described in the foregoing functions as will be described below for actual printing by the print head:

First, to prompt the user to enter an image, the human interface 17 allows the display device 15 and/or external monitor to provide a display for selection of one of the image input means 7 from each the image is to be entered. To take a desired image to be printed, the user operates the pointing device 8 to select one of the image input means 7 that is to be accessed. The computer interface circuit 12 may be selected, if applicable, using the host computer 19 in lieu of the pointing device 8.

Next, in the image input means 7 thus selected, an accessible digital image data and/or analog image data entered from outside is converted to a first digital image data by analog/digital conversion and the first digital image data is sent to the image processor 6 via the image data input/output 27.

The first digital image data is supplied to the data processor 5 in the image processor 6 where it is stored into the image memory 20 as necessary. If the image data has no ideal quality, it is corrected to improve the quality of an image displayed on the display device 15 and external monitor and that of an image printed by the image printer 3. If the first digital image data has a characteristic peculiar thereto, it is corrected and processed for improvement of its quality.

The image data corrected as in the above is delivered to the display device 15 and external monitor where an image is displayed. If a plurality of accessible image data exist in the image data input 1, each of them may be sent via the image data input/output 27 and image processor 6 to the display device 15 or external monitor where it is displayed and the user may be prompted under the control of the human interface 17 to select a desired image data. When an image is selected, if the selected image data has not be supplied to the image memory 20, the image input means 7 is accessed and the image data is taken into the image processor 6.

Next, the human interface 17 asks the user whether the selected image is to be edited or not. When the user wants to have the image processed, the human interface 17 selects to have the process executed, has a necessary process done and generates a second digital image data in the data processor 5 of the image processor 6.

Before the human interface 17 issues a printout instruction to the image printer 3, namely, before the user gives a printout instruction by means of the pointing device 8, the second digital image data generated by the data processor 5 is sent to the printout processor 24 under a printout process instruction from the human interface 17 to start the printout process.

This is also true when the data processor 5 has effected no edition process. The first digital image data from the image data input/output 27 is displayed at the image display output 2, and before the human interface 17 issues a printout instruction to the image printer 3, that is, before the user gives a printout instruction by means of the pointing device 8, the first digital image data is sent to the printout processor 24 under a printout process instruction from the human interface 17 to start the printout process.

Also in the printer system according to the present invention, if the user operates the pointing device 8 to give an edition process instruction in the middle of a printout process in the printout processor 24, the human interface 17 will issue an edition process instruction to the data processor 5 while issuing a printout process cancel instruction to the printout processor 24 to cancel the printout process.

More specifically, in the printer system, if the human interface 17 does not issue an edition process instruction to the data processor 5 or a printout instruction to the image printer 3 within the predetermined time after completion of the conversion to the first digital image data in the image data input 1, that is, if the predetermined time has passed while the user has not given an edition process instruction or printout instruction with the first digital image kept displayed on the image display output 2, the human interface 17 issues a printout process instruction to the printout processor 24 to start the printout process of the first digital image data. Thus, the time from issuance of the printout instruction until the print is started is considerably reduced, namely, the time required for printing is remarkably shortened. In the printer system according to the present invention, the printout is done for the standby time in the conventional printer system, namely, the processing capability of the printer system is fully utilized.

Also, if the human interface 17 does not issue an instruction for a next edition process to the data processor 5 or a printout instruction to the image printer 3 after completion of a predetermined edition process in the data processor 5, namely, if the user has given an instruction for a predetermined edition process to generate a second digital image data and does not give an instruction for a next edition process or a printout instruction with the second digital image kept displayed on the image display output 2, the human interface 17 will issue a printout process instruction to the printout processor 24 to start the printout process of the second digital image data edited by the predetermined edition process. Thus, useless printout process can be prevented as much as possible.

If an instruction for a next edition process is to change the predetermined input operation in the middle of the predetermined edition process and the next edition process instruction is not issued from the human interface 17 to the data processor 5 within a predetermined time, namely, if the user has made input of the predetermined edition process but the predetermined time has passed while the user has set no edition process, the human interface 17 will issue a printout process instruction to the printout processor 24 to start the printout process of the second digital data upon completion of the predetermined edition process. Thus, the time taken since the printout instruction is given until an image is printed out is considerably shortened even when various edition processes are done.

More specifically, the human interface 17 controls the data processor 5 and printout processor 24 in parallel with a priority given to the instruction from the human interface 17 to the data processor 5 rather than to that from the human interface 17 to the printout processor 24. Preferably, the printout process should be canceled if the edition process instruction is issued in the middle of the printout process in the printout processor 24. Thus, the printout process will not interfere with the edition process, so that the edition process can be done smoothly under an instruction from the user.

When the user gives a printout instruction, printing is effected. Namely, the print head drive 26 of the image printer 3 drives the print head 25 to print an image based on the print data. During the printing, the print head 25 operates synchronously with the operation of the recording medium.

Next, the circuit configuration of the printer system according to the present invention will be described below with reference to FIG. 6. As apparent from FIG. 6, the circuit diagram of the printer system is generally similar to that shown in FIG. 5. The printer system comprises circuits corresponding to the external input device 13, image input means 7, image data input/output 27, image processor 6, image display output 2, pointing device 8 and an image printer 3, respectively. That is, the printer system in FIG. 6 comprises an image data interface circuit 39, removable medium drive 40, film reader 41 and a computer interface circuit 42 all for the image input means 7 in FIG. 5, and an image data input/output circuit 31 for the image data input/output 27 in FIG. 5.

Also, for the image processor 6 in FIG. 5, the printer system comprises a data processing circuit 36 incorporating a data processor, display device processor, video signal processor and printout processor.

Further, the printer system comprises, for the pointing device 8 in FIG. 5, a plurality of keys 38a disposed on the printer system for use by the user for input operation and pen-touch input device 38b formed on a LCD monitor 45a disposed as the display device 15 in FIG. 5, the pen-touch input device 38b being operated by the user using a pen-like taper input tool, and a pointing device interface circuit 38c (which will further be described later) for input of data to a circuit corresponding to the human interface 17 in FIG. 5. The pointing device interface circuit 38c prevents an input error due to chattering or the like. When any one of the keys 38a or same part of the pen-touch input device 38b is continuously pressed for a predetermined time, the pointing device interface circuit 38c regards such an operation as if the key 38a or pen-touch input device 38b had been operated a plurality of times, and transmits an input to the circuit corresponding to the human interface 17 for the plurality of times. The printer system according to the present invention may be adapted so that when the user operates the key 38a or pen-touch input device 38b for giving any instruction, an interrupt signal is provided to the circuit (system control CPU 61) corresponding to the human interface 17 to transmit the input as shown in FIG. 6.

Correspondingly to the display device 15 of the image display output 2 in FIG. 5, there are provided the LCD monitor 45*a* and also a display device output circuit 45*b* which receives an image data transferred from the image memory 20, synthesizes based on the received image data and a display control signal from the circuit corresponding to the human interface 17 a menu screen and a control display screen for the pen-touch input device, and converts it to a drive signal displayable on the LCD monitor 45*a*.

Further there is provided a video signal output circuit 46 to synthesize a menu screen for display on an external monitor and a control display screen for the pen-touch input device, based on an image data transferred from the image memory 20 and a display control signal from the circuit (system control CPU) corresponding to the human interface 17, and convert the image data to a standard video signal displayable on the external memory such as NTSC signal. In this case, the images displayed on the LCD monitor 45*a* and external monitor may be same as or different from each other.

Furthermore, there are provided a print head drive circuit 56 and print head 25 correspondingly to the image printer 3 in FIG. 5. Also a printout mechanism control circuit 47 is provided to drive various motors, clutches, head maintenance mechanism, etc. based on mechanism control signals issued from software in the system control CPU 61 (will further be described later) and which are used for overall control of mechanisms necessary for forming an image on a recording medium such as a recording chart by the print head 25, receive signals from various sensors which detects the motion of the recording medium and that of the print head and supply the signals from the sensors to the system control CPU 61. Namely, the printout mechanism control circuit 47 is provided to drive and detect the status of the mechanisms required to print an image.

In the printer system, the system control CPU 61 uses a working RAM 64 under a control software in a system ROM 62 and flash memory 63. The system control CPU 61 controls the printer system as a whole, and also serves as a circuit corresponding to the human interface 17.

The system control CPU 61, system ROM 62, flash memory 63 and working RAM 64 are connected to each other by a system control bus 65 to which the image data input/output circuit 31, data processing circuit 36, pointing device interface circuit 38*c*, display device output circuit 45*b*, video signal output circuit 46, printout output mechanism control circuit 47 and image printer 3 are also connected. Of them, the image data input/output circuit 31, data processing circuit 36, display device output circuit 45*b*, video signal output circuit 46 and image printer 3 are connected to an image data bus 66 of the image memory 20 as well.

The control software in the flash memory 63 may be replaceable from the removable medium drive 40 or computer interface circuit 42 via the image data input/output circuit 31. The printer system may also be adapted so that when the data processing circuit 36 needs a unique control software but if there is no ROM or nonvolatile RAM in the data processing circuit 36, a software required for the data processing circuit 36 is transferred from the system ROM 62 or flash memory 63 to the data processing circuit 36. In this case, a software required for the data processing circuit 36 should preferably be supplied to the removable medium drive 40 and computer interface circuit 42, and stored in the flash memory 63 or working RAM 64 once, and then transferred to the data processing circuit 36.

The system control CPU 61 provides the following kinds of control under the control software in the system ROM 62 and flash memory 63:

First, it controls the printer system as a whole. Further, the system control CPU 61 provides the following kinds of control including: handling of image data supplied via the image data input/output circuit 31 by driving and controlling the image data interface circuit 39, removable medium drive 40, film reader 41 and computer interface circuit 42; control of the edition, synthesis, manipulation and correction of image data in the data processing circuit 36; control of image display on the LCD monitor 45*a* and external monitor, provides a human interface control for input of an instruction from the key 38*a* or pen-touch input device 38*b* and output to the LCD monitor 45*a* and external monitor, and control of the image printer 3 as a whole by controlling the print drive circuit 56, print head 25 and the printout mechanism control circuit 47.

Thus, the mechanism control software in the system control CPU 61 and the printout mechanism control circuit 47 vary in content and circuit configuration, respectively, depending upon the type of the print head 25, line head or serial head, the operating mode of the print head 25, and the operating mode of the recording medium. That is, the control software and control circuit depend upon the mechanical construction of the print head 25.

The system control CPU 61 has an operation management circuit to allow the data processor and printout processor in the data processing circuit 36 to operate in parallel in such a manner that priority is given to an instruction issued from the system control CPU 61 to the printout processor in the data processing circuit 36 rather than to an instruction issued from the system control CPU 61 to the data processor in the data processing circuit 36. More particularly, the control software in the system ROM 62 and flash memory 63 should include an operation management software, for the operation management circuit, consisting of multi-task OS such as $\mu$-ITORON.

It is preferable that the operation management circuit is adapted to detect from the pointing device interface circuit 38*c* an edition process instruction having been supplied by the user operating the pointing device, and allow the system control CPU 61 to issue a printout process cancel instruction to the printout processor if the printout processor is in progress of a printout process, to cancel the printout process.

Also it is preferable that the operation management circuit receives an interrupt signal from the pointing device interface circuit 38*c* and detects an edition process instruction based on a change of the interrupt signal.

In the foregoing, an example that an edition process instruction is detected based on a change of interrupt signal has been described herein, but the operation management circuit may be adapted to poll at each predetermined time to detect an edition process instruction from the controller.

Figure 6:
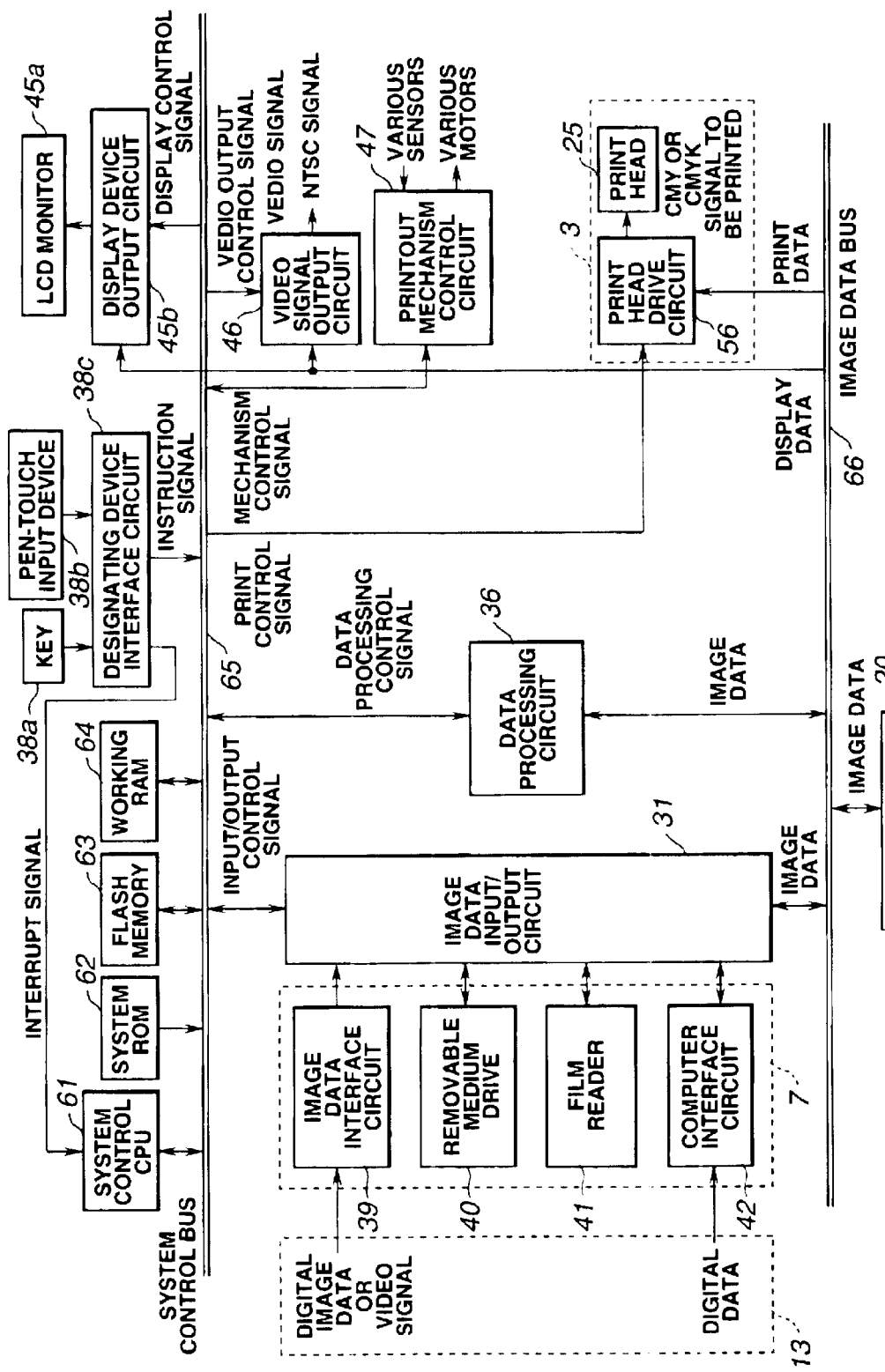
FIG. 6 is a circuit diagram of the printer system according to the present invention.

For an actual printing, an input image data is processed as will be described below:

As seen from FIG. 6, a digital image data, video signal or a digital data supplied from the external input device 13 is passed through the image data interface circuit 39, removable medium drive 40, film reader 41 and computer interface circuit 42, all corresponding to the image input means 7 in FIG. 5 and thus converted to a first digital image data, and the first digital image data is supplied to the image data input/output circuit 31 corresponding to the image data input/output 27 in FIG. 5.

Next, the first digital image data is passed to the data processing circuit 36 over the image data bus 66 under the control of an input/output control signal from a system control bus 65. It is of course that at this time, the system control CPU 61 controls the timing, etc. of these operations.

The data processing circuit 36 makes predetermined edition process of the first digital image data to provide a second digital image data which will be stored into the image memory 20 as necessary. In this case, an instruction for a predetermined edition process is sent from the key 38a or pen-touch input device 38b to the data processing circuit 36 via the pointing device interface circuit 38c. Also at this time, the system control CPU 61 controls the timing, etc. of the these operations.

The second digital image data having been processed in a predetermined manner in the data processing circuit 36 is sent to the display device output circuit 45b and video signal output circuit 46 for display of an image on the display device.

In this printer system, before the user gives a printout instruction from the key 38a or pen-touch input device 38b, the system control CPU 61 issues a printout process instruction for conversion of the second digital image data to a print data in the printout processor in the data processing circuit 36, to thereby start a printout process. Thereafter, when the user determines to print an image displayed on the display device and gives an image printout instruction by operating the key 38a or pen-touch input device 38b, the system control CPU 61 ill issue a printout instruction to the print head drive circuit 56 to which the print data is also sent, and an image is printed. Also in this case, the system control CPU 61 controls the timing of these operations, of course. Needless to say, each of the components having been described so far performs its own function.

This is also true when the first digital image data has not be subjected to the edition process. Namely, before the user gives a printout instruction from the key 38a or pen-touch input device 38b, the system control CPU 61 issues a printout process instruction for conversion of the first digital image data to a print data in the printout processor in the data processing circuit 36, to thereby start a printout process. Thereafter, when the user determines to print an image displayed on the display device and gives an image printout instruction by operating the key 38a or pen-touch input device 38b, the system control CPU 61 ill issue a printout instruction to the print head drive circuit 56 to which the print data is also sent, and an image is printed.

However, if the user operates the key 38a or pen-touch input device 38b to give an edition process instruction in the middle of an edition process, the operation management circuit in the system control CPU 61 detects the edition process instruction given by the user operating the pointing device and supplied from the pointing device interface circuit 38c and issues an edition process instruction to the edition processor in the data processing circuit 36 to allow the edition processor to effect edition process. If the printout processor in the data processing circuit 36 is in the middle of a printout process, the operation management circuit issues a printout process cancel instruction to cancel the printout process being done.

When the edition process are done and generate a second digital image data, the second digital image data is sent to the display device output circuit 45b and video signal output circuit 46 and displayed. Before issuing a printout instruction, the system control CPU 61 will issue a printout process instruction for conversion of the second digital image data to a print data in the printout processor in the data processing circuit 36 to start the printout process.

More specifically, in the printer system according to the present invention, if the system control CPU 61 does not issue an edition process instruction to the data processor 5 in the data processing circuit 36 or a printout instruction to the image printer 3, within the predetermined time after an input image data is converted to a first digital image data in the circuit corresponding to the image data input 1 in FIG. 5, that is, if the predetermined time has passed with the first digital image data kept displayed on the LCD monitor 45a or on the external monitor while the user does not give the edition process instruction or printout instruction, the system control CPU 61 will issue a printout process instruction to the printout processor in the data processing circuit 36 to allow the printout processor to start the printout process of the first digital image data. Thus, the time required for printing is considerably reduced. The printout process is done for the standby time in the conventional printer system, namely, the processing capability of the printer system is fully utilized.

Also, if the system control CPU 61 does not issue an instruction for a next edition process to the data processor 5 or a printout instruction to the image printer 3 within the predetermined time after the predetermined edition process is completed in the data processor of the data processing circuit 36, that is, if the predetermined time has passed with no next edition process instruction or printout instruction given by the user while a second digital image data produced by the predetermined edition process designated by the user being displayed on the LCD monitor 45a or external monitor, the system control CPU 61 will issue a printout process instruction to the printout processor in the data processing circuit 36 to allow the printout processor to start a printout process of the second digital image data edited by the predetermined edition process. Thus, useless printout process can be prevented as much as possible.

If the next edition process instruction si to change the predetermined input operation in the middle of the predetermined edition process and it is not issued from the system control CPU 61 to the data processor in the data processing circuit 36 within a predetermined time, namely, if the user has made an input of the predetermined edition process and the predetermined time has passed with the predetermined edition process not set in the middle of the input operation, the system control CPU 61 will issue a printout process instruction to the printout processor to start a printout process of the second digital image data at completion of the predetermined edition process. Thus, the time from issuance of the printout instruction until actual printing can considerably be reduced even when various edition processes are done.

As previously mentioned, when an edition process instruction is issued in the middle of a printout process in the printout processor, the operation management circuit in the system control CPU 61 cancels the printout process, so the printout process will not interfere with the edition process which can thus be executed smoothly based on the instruction from the user.

Next, the data processing circuit 36 will further be described below with reference to FIG. 7. As shown, the data processing circuit 36 has a data processing control system 74 comprising mainly a data processing CPU 71, data processing program RAM 72 and a data processing working RAM 73. Further it comprises a plurality of arithmetic circuits 75 having same functions, and also a data router circuit 76 which sends to these arithmetic circuits 75 data which control the destinations of data delivered from the arithmetic circuits 75. The data router circuit 76 is controlled by the data processing control system 74. Also, the control from the system control CPU 61 in FIG. 6 is accepted by a system control bus interface 77. The data processing control system 74, data router circuit 76 and system control data interface 77 are connected to each other by a data processing bus 79. Further, the data processing circuit 36 comprises an image data bus interface 78 to provide a control for input and output of an image data.

That is, the system control bus interface 77 accepts the control from the system control CPU 61 and transmits it to the data processing CPU 71, and sends information from the data processing CPU 71 such as operating status, etc. to the system control CPU 61.

The data processing circuit 36 will process data as in the following:

Note that a procedure of processing an image data held in the image memory 20 and shoring the processed image data into the image memory 20 will be described.

First, a data processing software for the above-mentioned procedure is read from the flash memory 63 or system ROM 62 of the system control CPU 61 and transferred to the data processing program RAM 72 via the system control bus interface 77. Next, the system control CPU 61 will issue an instruction for starting the execution of the data processing software to the data processing CPU 71 via the system control bus interface 77. Based on the data processing software transferred to the data processing program RAM 72, the data processing CPU 71 will read a desired image data from the image memory 20 via the image data bus interface 78, and supply it via the data router circuit 76 to a predetermined one of the arithmetic circuits 75. Each of the arithmetic circuits 75 processes an input image data based on the data processing software, and writes an image data thus processed into the image memory 20 via the data router circuit 76 and image data bus interface 78.

For a next arithmetic operation, the image data is supplied to a next predetermined one of the arithmetic circuits 75 via the data router circuit 76. Image data are sequentially read out of the image memory 20 and stored as image data again into the image memory 20 in this way, to thereby process data according to the data processing software.

In the middle of an image data processing or after all image data have been processed, the data processing CPU 71 will inform the system control CPU 61 of the current status or result of the image data processing via the system control bus interface 77, whereby the system control CPU 61 will be able to know the status or result of the data processing. The data processing working RAM 73 is used to hold a data processing parameter sent from the system control CPU 61 and the operating status of the data processing CPU 71.

The plurality of arithmetic circuits 75 is set to execute the same process, and they are selectively usable depending upon the data position in an image. More specifically, for example, data in the first row of an image is processed by a one A of the arithmetic circuits 75 while data in the second row is processed by a one B of the arithmetic circuits 75. It should be noted that data may be processed in units of line, not row.

It should be noted that the plurality of arithmetic circuits 75 may be set to work in different manners, respectively, and that a data processed by a certain one of the arithmetic circuits 75 may be supplied via the data router circuit 76 to another arithmetic circuit 75 which works differently from the certain one. Thus, if there is a plurality of processes to be performed, an image data read out from the image memory 20 can be written again into the image memory 20 after being sequentially subjected to various processes, whereby the number of times of access to the image memory 20 can preferably be reduced.

Namely, the plurality of arithmetic circuits 75 may be set in advance to work in the same manner or in different manners depending upon a data processing program to be executed. The number of the arithmetic circuits 75 connected in parallel to each other is selected depending upon a required speed of processing, scale of each of the arithmetic circuits 75, etc.

Figure 7:
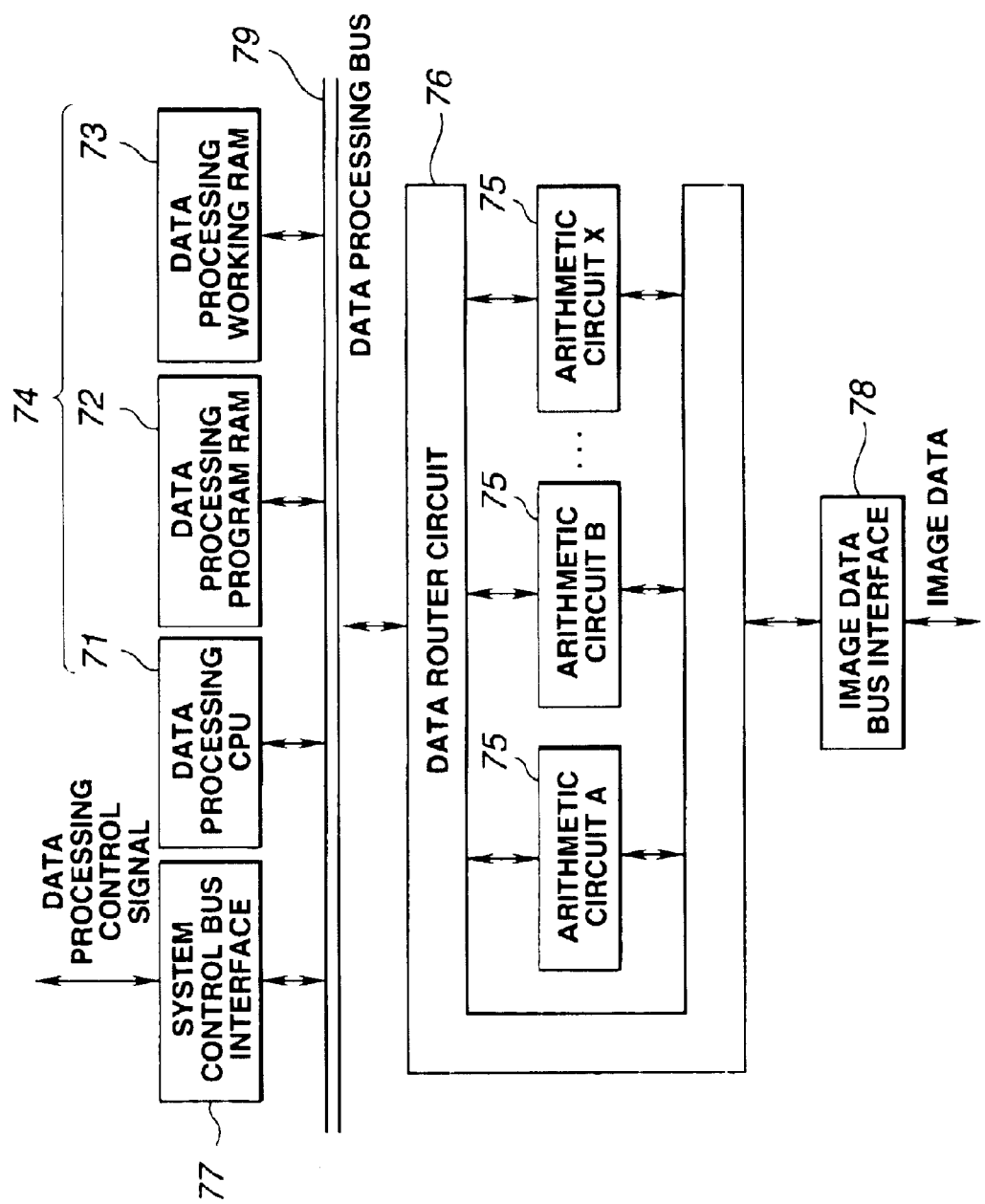
FIG. 7 is a circuit diagram of an example of data processing circuit in the printer system according to the present invention.
Figure 8:
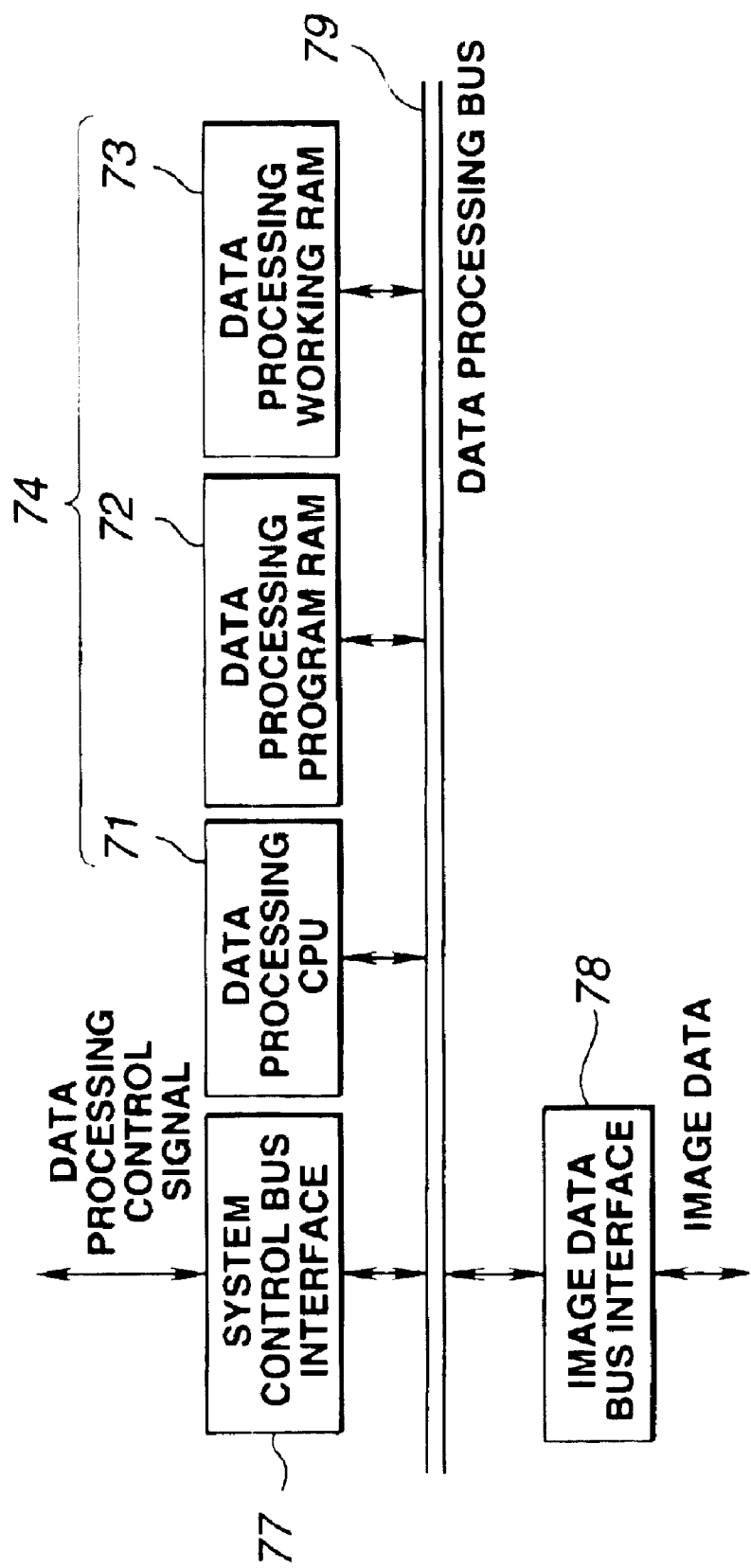
FIG. 8 is a circuit diagram of another example of data processing circuit in the printer system according to the present invention.

The data processing circuit may be synthesized as will be described below with reference to FIG. 8:

As shown, the data processing circuit is as shown in FIG. 8, which is similar to a one shown in FIG. 7 except for the arithmetic circuits 75 and data router circuit 76. Therefore, the same and similar components are indicated with same references as in FIG. 7 and will not further be described herein. Note however that the data processing CPU 71 in this data processing circuit should be a higher speed one, such as DSP (digital signal processor), RISC (restricted instruction set computer) CPU or a dedicated data processing CPU.

Figure 9:
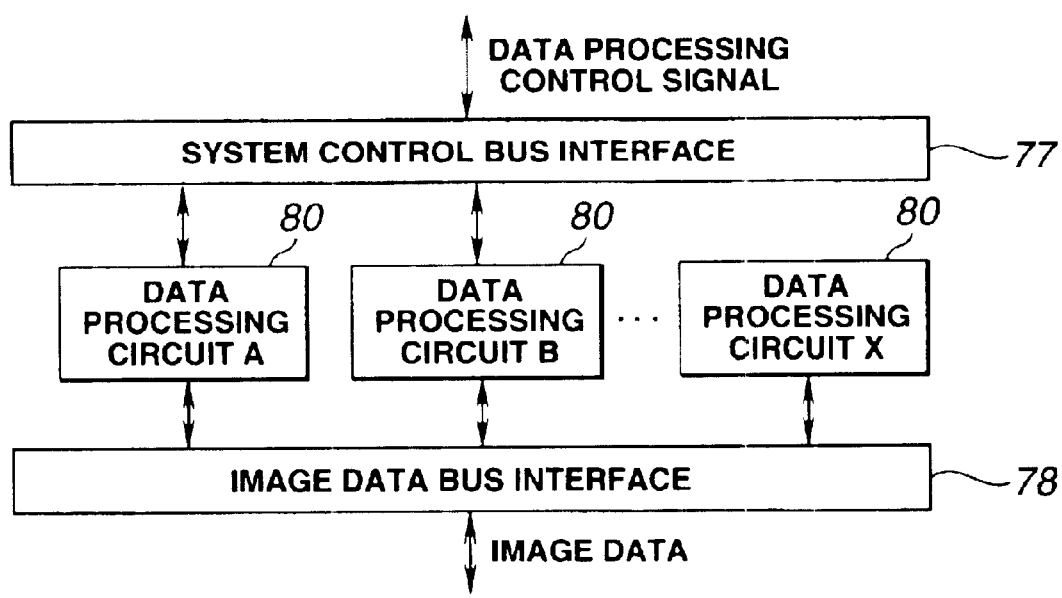
FIG. 9 is a circuit diagram of a still another example of data processing circuit in the printer system according to the present invention.

The data processing circuit may also be synthesized as will be described below with reference to FIG. 9:

Namely, in the data processing circuit, a plurality of data processing circuits 80 are provided and connected in parallel to each other, each of which is connected to an overall system control system formed from the system control CPU 61 via the system control bus interface 77 and to the image data bus 66 via the image data bus interface 78. Each of the data processing circuits 80 may be formed from a dedicated arithmetic circuit, a general-purpose arithmetic circuit and genera-purpose arithmetic control circuit, or only a genera-purpose arithmetic control circuit. A control software from the system control CPU 61 is sent via the system control bus interface 77 to each of the data processing circuits 80 which is controlled by the control software to process an image data in the image memory 20. Like the arithmetic circuits 75 in FIG. 7, the data processing circuits 80 may be set in advance to process an image data in the same manner or in different manners depending upon the disposition of data in the image.

Figure 10:
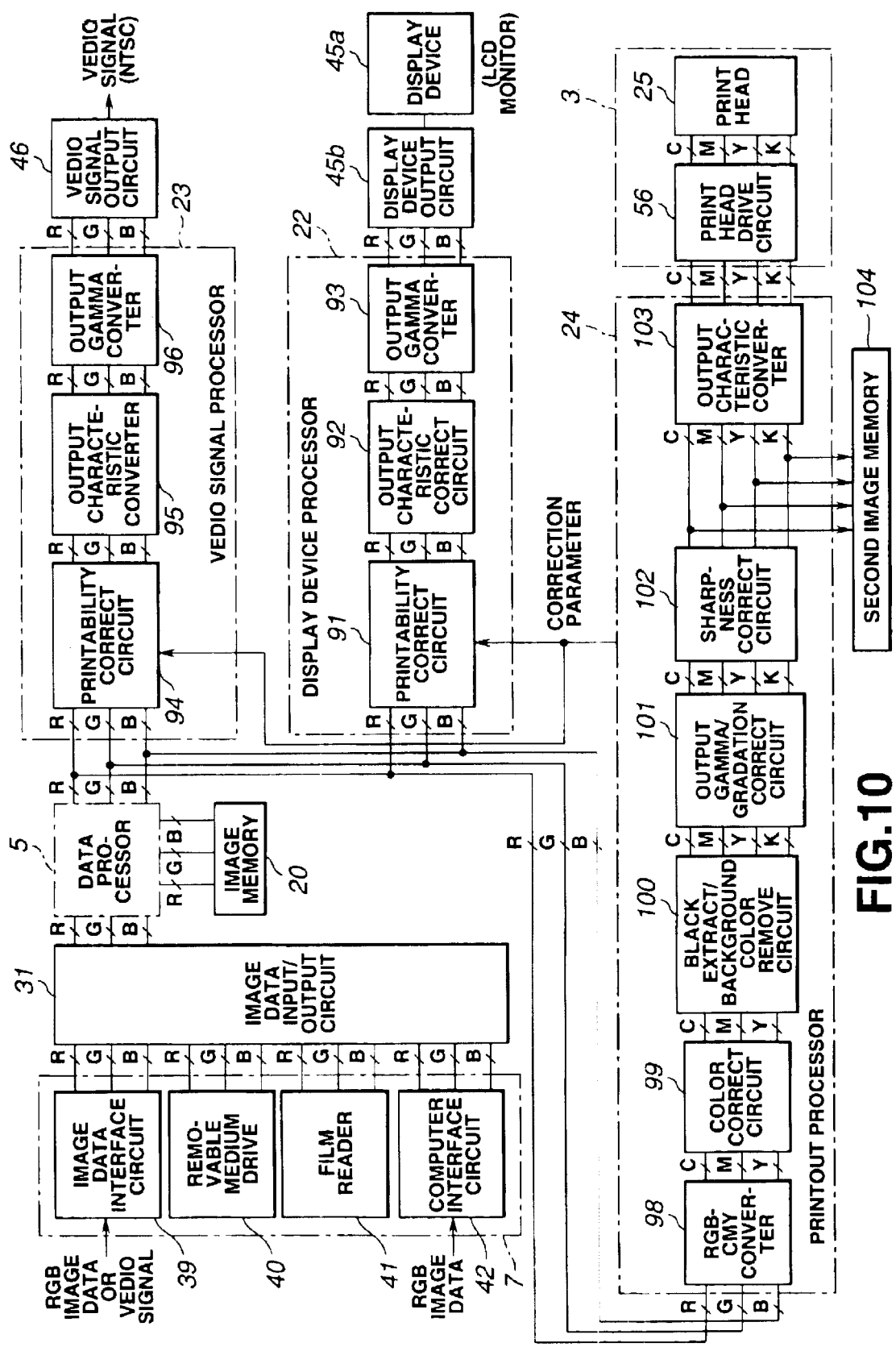
FIG. 10 is a circuit diagram showing an example of flow of data processing operations in the printer system according to the present invention.

Next, the flow of data processing operations in the printer system according to the present invention will be described herebelow with reference to FIGS. 10 and 11. It should be noted here that a slash marked on a line indicative of a data flow in FIGS. 10 and 11 means that the data transmitted over the line is an 8-bit/color data. As having previously been described with reference to FIGS. 5 and 6, the computer interface circuit 42 of the image input means 7 in FIG. 10 delivers an external input RGB image data as an RGB image data to the image data input/output circuit 31 to which the image data interface circuit 39, removable medium drive 40 and film reader 41 of the image input means 7 also deliver a read image data or video signal as an RGB image data.

Next, in the image data input/output circuit 31, an image data supplied from each of the image input means 7 is processed to be equally handled and delivered as a first digital image data to the data processor 5.

Figure 11:
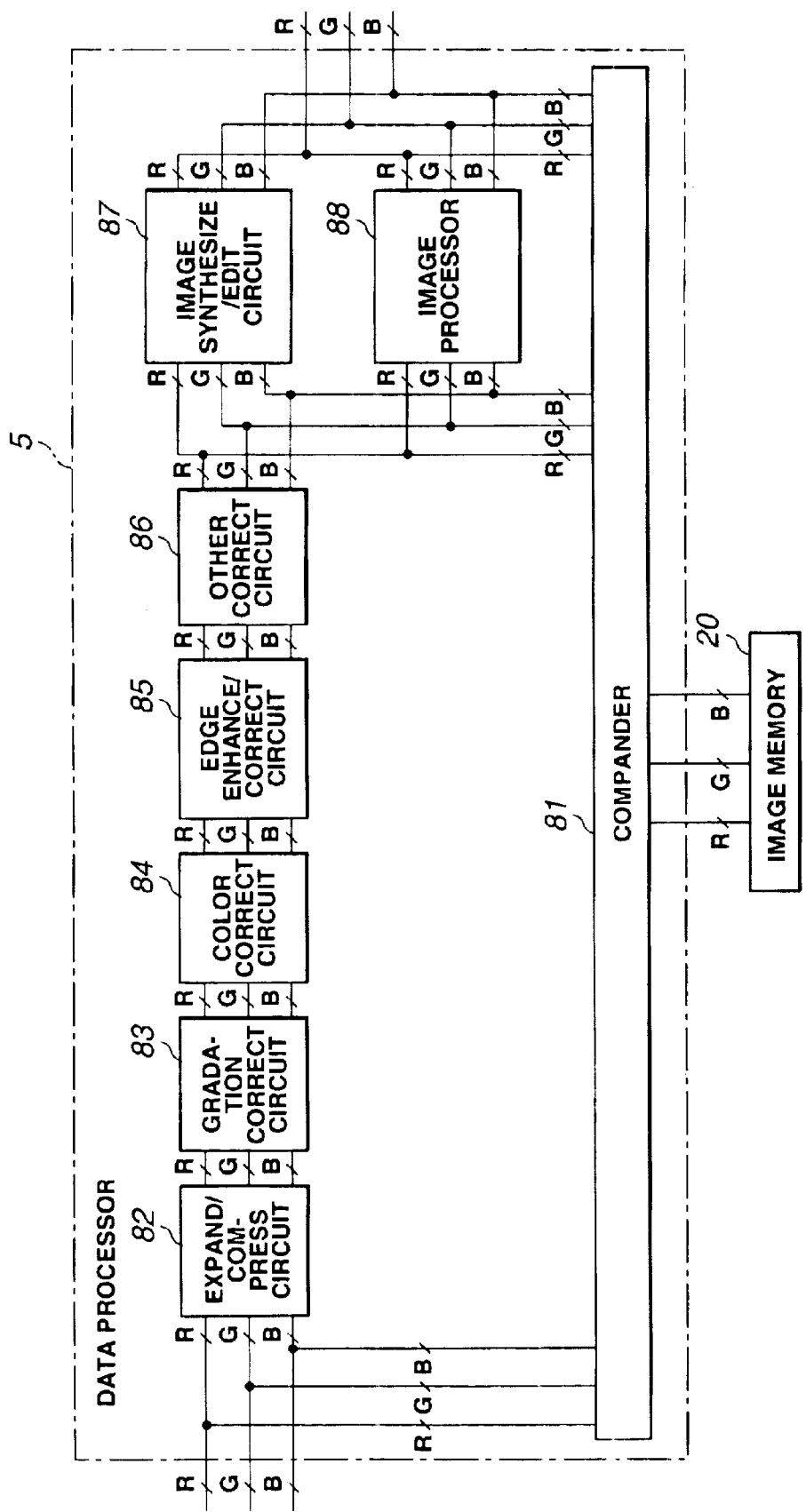
FIG. 11 is a circuit diagram sowing the flow of data processing operations in a data processor in the printer system according to the present invention.

As shown in FIG. 11, the data processor 5 comprises a compander 81, expansion/compression circuit 82, gradation correction circuit 83, color correction circuit 84, edge enhancement/correction circuit 85 and other correction circuit 86, image synthesis/edition circuit 87 and an image processor 88. If an image data supplied from the image data input/output circuit 31 has no ideal quality, the data processor 5 corrects it to improve the quality of an image displayed on the display device 45a or external monitor and that of an image printed by the image printer 3. If the image data has a characteristic peculiar thereto, the data processor 5 processes it for correction and improved quality.

The compander 81 is used to hold an image data in the image memory 20 in a reversibly or irreversibly compressed status. It compresses for storage in the image memory 20 an RGB image data supplied thereto, RGB image data having been subjected to various edition processes, and an RGB image data having been subject to an edition process and going to be subjected to another edition process. The data processor 5 has also a function to read a compressed image data from the image memory 20, expands it, processes it in various manners as an RGB image data not yet compressed, and delivers to various functional parts thereof.

The RGB image data supplied to the data processor 5 is supplied to the expansion/compression circuit 82 which expands or compresses the supplied image data if it has a size beyond a range in which an image data can be handled by the printer system according to the present invention.

The RGB image data is then supplied to the gradation correction circuit 83 next to the expansion/compression circuit 82. If an input image data has a considerably ill-balanced gradation histogram, for example, the gradation correction circuit 83 corrects the gradation characteristic of the image data for the image data to have an improved quality when it is printed. More specifically, if the exposure of an object to light for pickup of the input image data is not proper, the whole image is too dark or bright. The gradation correction circuit 83 corrects the image data to improve the gradation characteristic of the whole image. Also, it corrects the gamma characteristic of the input image data if possible.

The RGB image data is supplied to the color correction circuit 84 provided following the gradation correction circuit 83. If the input image data has a considerably ill-balanced color characteristic, for example, the color correction circuit 84 corrects the color characteristic of the input image data so that the image printed has an improved quality. Also, if the input image data has a certain color, especially, flesh color and gray color, departing from an appropriate range, the color correction circuit 84 can make a correction of the inappropriate color portion of the image data to the appropriate range in addition to the overall color correction.

The RGB image data is supplied to the edge enhancement/correction circuit 85 next to the color correction circuit 84. If the input image data has no definite edge or profile or an edge too much enhanced, the edge enhancement/correction circuit 85 corrects the edge enhancement for the image data to have an appropriate edge.

The RGB image data is further supplied to the other correction circuit 86 next to the edge enhancement/correction circuit 85. The other correction circuit 86 is provided to effect a further process, if added to the aforementioned processes, for improvement of the image quality.

In the foregoing, sequential processing of an input image data in various processing circuits has been described. Any unnecessary ones may be omitted from the above-mentioned processes. Also they may be effected in a different sequence from described in the above.

The RGB image data having been subjected to the various edition processes is supplied to the image synthesis/correction circuit 87 and image processor 88. These circuits will process the input image data based on an instruction given from the user via the human interface, and synthesize and edit a plurality of input images, if applicable, to provide a second digital image data and produce an image to be printed finally.

Also in the image synthesis/edition circuit 87 and image processor 88, an input image data can be mixed with a previously prepared image pattern. Further, the user can supply an image pattern by operating a pointing device such as the pen-touch input device, and the image pattern can be mixed with an input image pattern under the control of the human interface which is in process of editing.

The control software for synthesis, edition and manipulation of such an image data and a previously prepared image pattern can be configured for new input from the removable medium drive 40 and computer interface circuit 42.

An RGB signal delivered from the data processor 5 is supplied to the display device processor 22, video signal processor 23 and printout processor 24.

If the display device 45a has a display output characteristic peculiar thereto so that an image data delivered from the data processor 5, when supplied as it is to the display device 45a, cannot be displayed with no high quality or a quality equivalent to that which would be when it is printed, because of the display output characteristic of the display device 45a, the display device processor 22 corrects the display output characteristic peculiar to the display device 45a. The display device processor 22 comprises a printability correction circuit 91, output characteristic correction circuit 92 and an output gamma converter 93, disposed in sequence therein.

The video signal processor 23 converts an image data delivered from the data processor 5 to a standard video signal, typically, an NTSC signal, which is provided as an output. The video signal processor 23 comprises a printability correction circuit 94, output characteristic converter 95 and an output gamma converter 96, provided in sequence therein. Also, if the representable range of an image data is different from a one defined by a standard video signal, the video signal processor 23 converts the representable range of the image data to that of standard video signal. It should be noted that the video signal processor 23 can also handle a quasi-standard video signal in lieu of a standard video signal. Especially the chroma of an image data is increased to be larger than that of a standard video signal for a more beautiful display of the image.

To record an image data output from the data processor 5 on a recording medium by the print head 25, the printout processor 24 converts the image data to a signal (print data) which can be supplied to the print head drive circuit 56. The conversion in the printout processor 24 is attained through a conversion using a LUT (lookup table), an arithmetic operation using an arithmetic circuit which can effect an OR operation at a high speed, an arithmetic operation under a software including a high-speed arithmetic algorithm or a conversion by a dedicated conversion circuit. If an image data is always handled with the same number of bits as that of bits in each of input image data, the effective precision of each data is lower for sequential arithmetic operations. In this case, such a low precision can be avoided by increasing the number of bits in each data in the middle of an arithmetic operation to be larger than that of bits in a first image data while decreasing the number of bits that has been increased in the last processing.

As shown, the printout processor 24 comprises an RGB-CMY converter 98, color correction circuit 99, black extraction/background color removal circuit 100, output gamma correction/gradation correction circuit 101, sharpness correction circuit 102, second image memory 104 and an output characteristic converter 103, provided in sequence.

The RGB-CMY converter 98 is provided to convert an RGB image data to data of colors C (cyan), M (magenta) and Y (yellow) of inks or toners used at the print head 25. This conversion can be attained by a concentration log conversion, complementary color conversion, linear masking conversion or the like.

The image data converted to a CMY image data as in the above is supplied to the color correction circuit 99 which is provided to correct a deviation of color (especially, hue and chroma) taking place in the CMY image data printed by the image printer 3 for the reason that the spectral absorption characteristic of inks or toners in CMY colors is different from the ideal characteristic of the subtractive color mixture.

The color correction circuit 99 effects a color correction through a conversion by LUT (lookup table) and arithmetic operation, linear masking operation, nonlinear masking operation or the like. There takes place a difference between the maximum representable range of an image data and the maximum range of printing of the image data on a recording medium by the print head 25. If the maximum representable range of an image data is larger than the maximum printable range thereof, a portion of the image data by which the maximum representable range is larger than the maximum printable range cannot be reproduced unless the image data is appropriately processed. In the color correction circuit 99, the entire image data has to be converted by compressing or clipping in order to print the entire image fully on the recording medium. Further, a conversion should be made as the case may be to avoid a color deviation due to the compressing conversion or clipping conversion.

Next, the CMY image data is supplied to the black extraction/background color removal circuit 100. If the print head 25 uses black (will be referred to as "BK" hereinafter) ink or toner and each of CMY data contains BK constituent, the black extraction/background removal circuit 100 replaces the BK constituent with BK ink or toner. Thereafter, each BK constituent in the CMY image data, having been replaced with BK ink or toner is removed from the CMY image data.

The BK constituent in the CMY image data may be replaced with BK ink or toner in any of various manners such as full replacement, replacement at a predetermined ratio, replacement in area of which the concentration is higher than predetermined, etc. By representing the BK constituent of the CMY data with BK ink or toner, it is possible to attain a sufficient level of the representation of the black constituent of an image that cannot sufficiently be reproduced. Note that the data of BK constituent is indicated with "K" in FIG. 10.

Next, the CMYK image data is supplied to the output gamma correction/gradation correction circuit 101. If the image reproduction parameters for printing by the print head 25 on the recording medium include printout characteristics peculiar to the recording ink or toner and half-tone reproduction method, this circuit 101 corrects the output gamma and gradation suitably for the printout characteristics. In the output gamma correction/gradation correction circuit 101, an original image data is converted for the best reproduction of a gradation when it is printed.

Next, the CMYK image data is supplied to the sharpness correction circuit 102 which enhances the edge of an image and smoothes the image to improve the quality of a printed image.

The this embodiment of printer system according to the present invention is adapted so that for the quality of an image displayed on the display device 45a and of the image displayed on an external monitor to be visually same as that quality of the image printed by the image printer 3, a display output characteristic setting which defines the display quality at the image display output 2 is corrected correspondingly to a print characteristic setting which defines the print quality at the image printer 3.

More particularly, a parameter for a correction to be done by the display device processor 22 and video signal processor 23 correspondingly to a change of print characteristic of the printout processor 24, namely, a content of processing, are supplied to the printability correction circuit 91 of the display device processor 22 and the printability correction circuit 94 of the video signal processor 23.

That is, in the display device processor 22, the RGB image data is given a correction parameter at the printability correction circuit 91 to which it is first supplied, further processed and displayed at the display device 45a.

This is also true at the video signal processor 23. The RGB image data is given a correction parameter at the printability correction circuit 94 to which it is first supplied, further processed and displayed at the external monitor.

As a result, the quality of the image displayed on the display device 45a and external monitor and that of the image printed by the image printer 3 are visually equivalent to each other.

In this embodiment of printer system according to the rpesent invention, the first digital image data supplied from the image data input/output circuit 31 or the second digital image data obtained by edition of the first digital image data at the data processor 5 is processed for printout by the components of the printout processor 24 including from the RGB-CMY converter 98 to sharpness correction circuit 102 before an instruction is given for printout of the first or send digital image data, thereby providing a print data. At this time, it is possible to store, into the second image memory 104 of this printer system, the print data resulted from the processing by the components of the printout processor 24 including from the RGB-CMY converter 98 to sharpness correction circuit 102.

The CMYK image data is supplied to the output characteristic converter 103 which is provided to improve the print quality by correcting the printout characteristic according to the type of the print head 25, drive method of the print head 25, type of the recording medium, type of ink or toner, etc. More specifically, the printing ambient temperature, thermal hysteresis, nonuniformity of elements of the print head 25, etc. are corrected for the above purpose. Of these kinds of correction, ones suitable for correction by the print head drive circuit 59 should be effected by the print head drive circuit 59.

In this embodiment of printer system, only after the user gives an image printout instruction to the image printer 3, the print data produced as in the above is sent to the image printer 3 by which it is printed. At this time, the print data should preferably be printed after more than one of the ambient temperature correction, thermal hysteresis correction and nonuniformity correction are effected by the output characteristic converter 103.

In the embodiment, the display characteristics of the display device processor 22 and video signal processor 23 are corrected according to the print characteristic of the image printer 3, namely, the content of a processing by the printout processor 24, for the quality of an image displayed on the image display output and that of the image printed by the image printer to be visually equal to each other. However, the print characteristic of the image printer 3, that is, the content of a processing by the printout processor 24, may be corrected according to the display output characteristics of the display device processor 22 and video signal processor 23.

Figure 12:
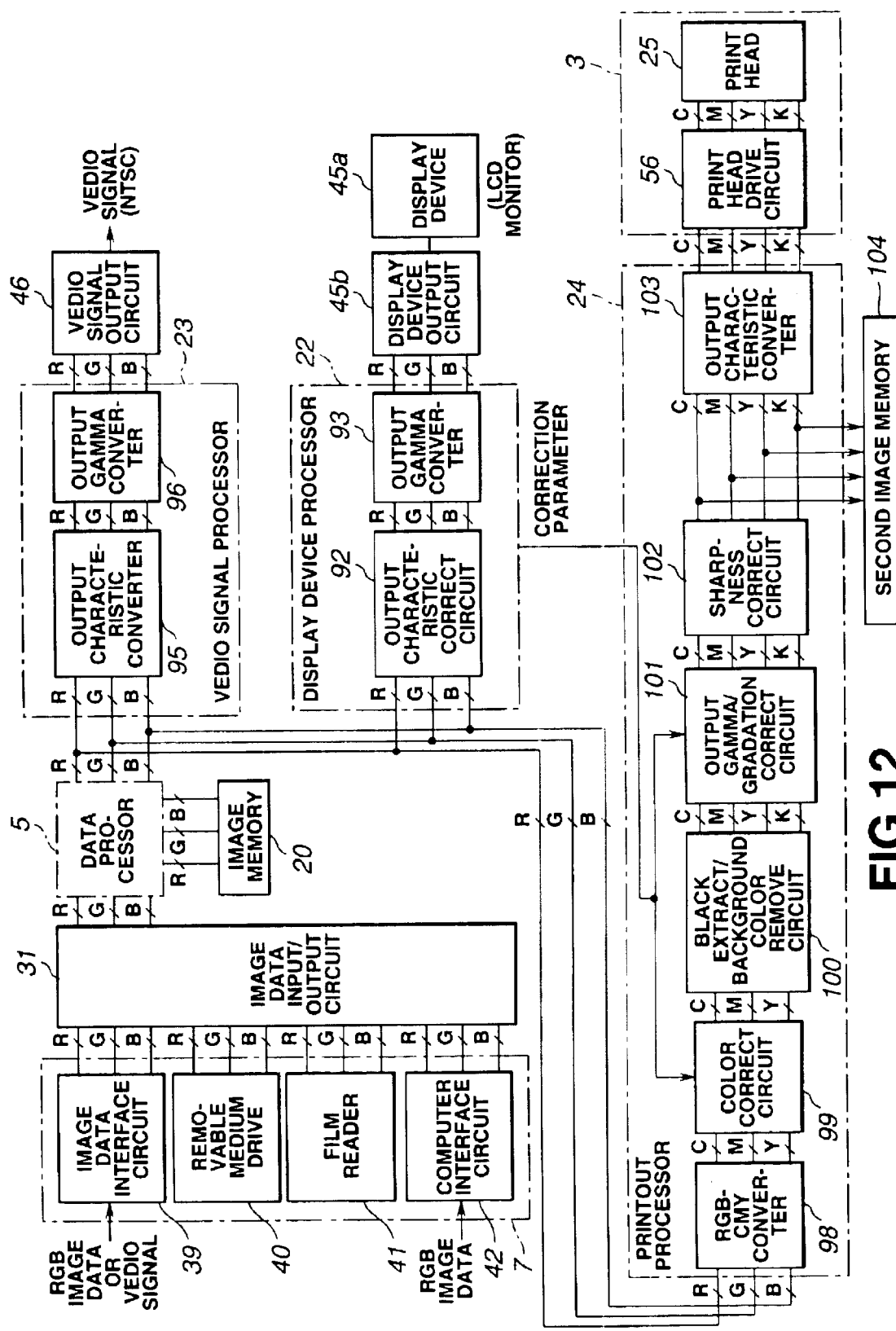
FIG. 12 is a circuit diagram showing another example of flow of data-processing operations in the printer system according to the present invention.

Namely, the data may be supplied as in FIG. 12. FIG. 12 is similar to FIG. 10 except that there are not provided the printability correction circuit 91 of the display device processor 22 and printability correction circuit 94 of the video signal processor 23 and accordingly there is not the lines indicating the correction parameter from the printout processor 24. Therefore, other components are indicated with same references as in FIG. 10 and will not be described any further.

However, in case the data are supplied as in FIG. 12, a correction parameter indicating the content of a processing to be done by the printout processor 24 correspondingly to a change of the display output characteristic of the display device processor 22, for example, in order to assure a visually equal quality is supplied to the color correction circuit 99 and output gamma correction/gradation correction circuit 101 of the printout processor 24.

Namely, in the printout processor 24, the RGB image data is given a correction parameter at the color correction circuit 99 and output gamma correction/gradation correction circuit 101, at which the image characteristic is substantially determined, it is further processed and printed by the image printer 3.

As a result, the image displayed on the display device 45a and the image printed by the image printer 3 are visually equal in quality to each other.

Note that the display device processor 22, video signal processor 23 and printout processor 24 should preferably be provided with a nonvolatile memory to store a correction parameter in a rewritable status so that the image data can always be processed using an optimum correction parameter.

Figure 13:
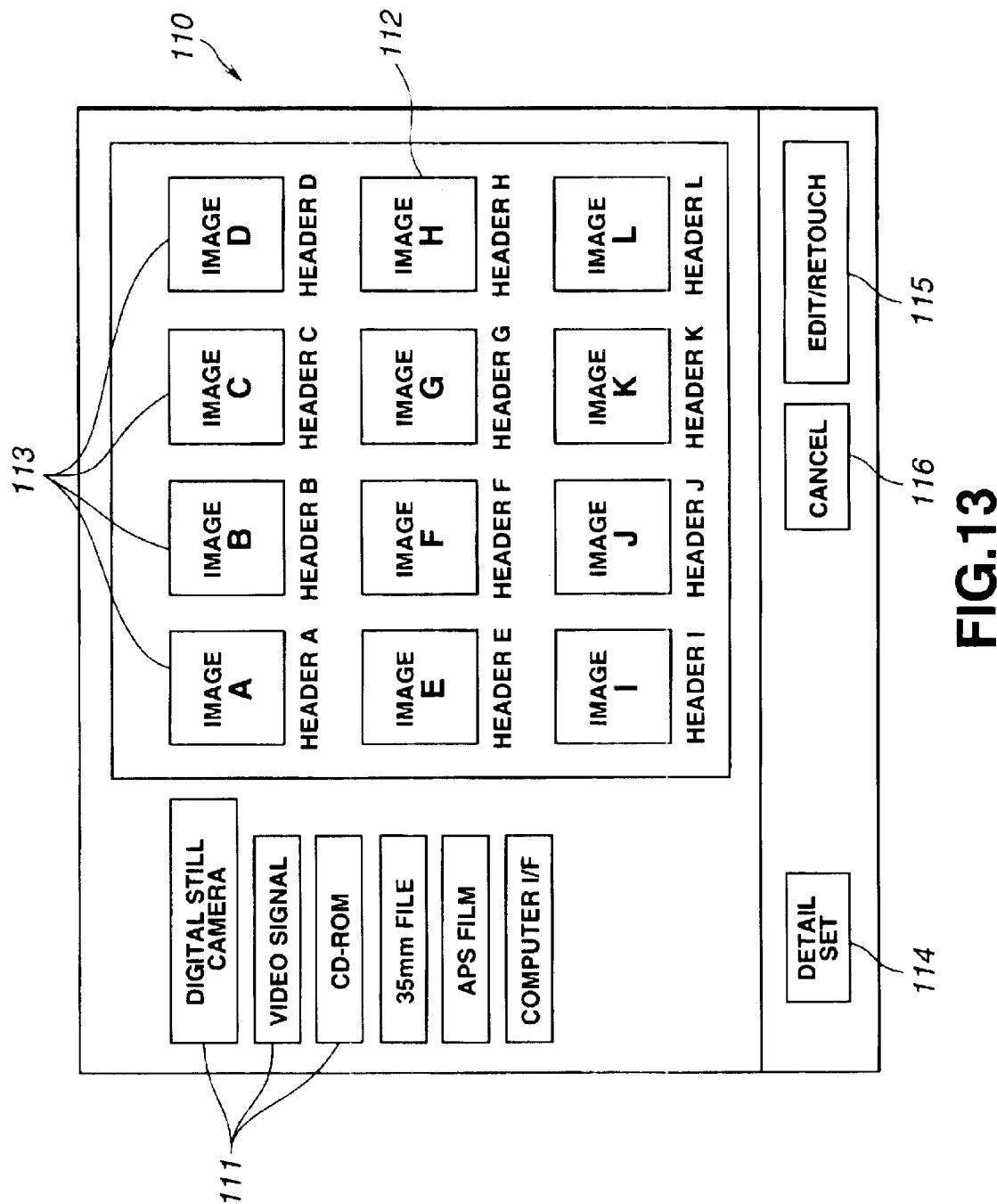
FIG. 13 is a schematic illustration of an example of image displayed on a display device or external monitor of the printer system according to the present invention.

Display of a menu screen or the like on the display device 15 or external monitor has previously been described. An example of such display will be described in detail in the order of operations. A first one of such menu screens may be a screen 110 shown in FIG. 13, for example. It should be noted that the screen is a one of which a predetermine portion, when directly touched, makes a corresponding input. As shown in FIG. 13, there are displayed on the screen 110 mainly a plurality of select keys 111 having marked thereon names for selection of external input device and image input means, and an image display area 112. In the image display area 112, when any one of the external input device and image input means is selected by a corresponding one of the select keys 111, accessible images 113 will be displayed as reduced in scale.

Also there will be displayed on the screen 110 a detail set key 114 for use to select an image 113 under predetermined conditions, an edit/process key 115 for use to edit or process a selected image 113, and a cancel key 116 to cancel a process being done.

First, when on the display screen, the user operates the select keys 111 to select one of the external input device and image input means, a plurality of images 113 thus readable into the printer system are displayed in the image display area 112. At this time, if there is information relevant to the images 113, such as header information, the information are displayed in association with the images 113.

Next, when the user selects a desired one of the images 113 being displayed, an indication that it is selected is given to the selected image 113.

The screen 110 should preferably be adapted so that when the user selects the detail set key 114, conditions can be entered and the user can select images 113 under predetermined conditions such as date of image acquisition.

Further, the screen 110 should preferably be adapted so that with the edit/process key 115 selected, predetermined edition, manipulation, synthesis and correction can be done of the images 113 selected by the user.

Figure 14A:
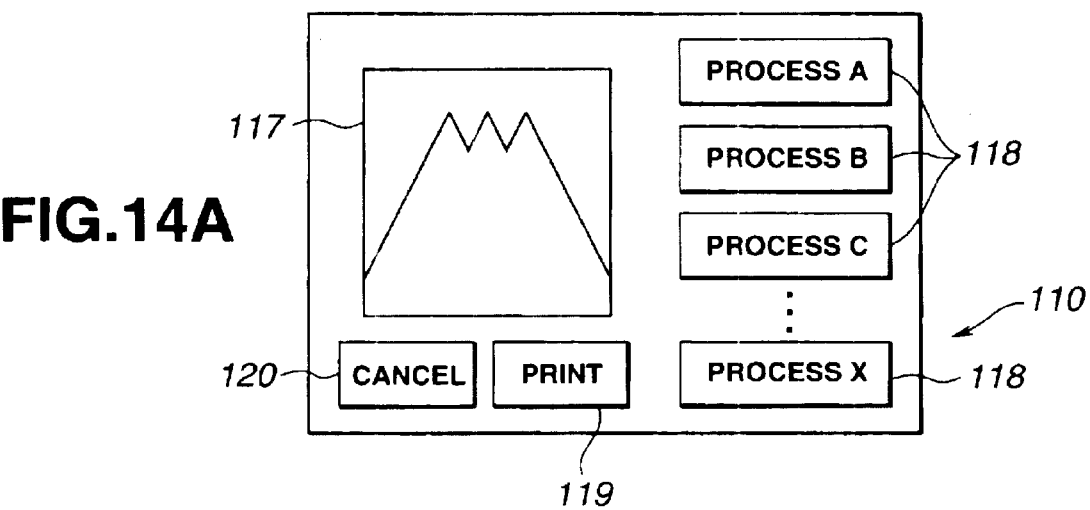
FIGS. 14a, b, and c are illustrations to which reference will be made an explaining other examples of images displayed on the display device or external monitor of the printer system according to the present invention.

Moreover, the screen 110 should preferably be adapted so that with the edit/process key 115 selected, a process screen is displayed on the screen selected as in the above. That is, as shown in FIG. 14A, there are displayed on the screen a selected image 117, a plurality of process select keys 118 with markings of process names including process A, process B, process C, . . . , process X, print key 119 for instruction to start of a printing, and a cancel key 120 to cancel a process being done.

Namely, the user selects the process select key 118 to effect a processing of an image 117. In this case, the image 117 is given an indication that it is being processed or a result of the processing.

If it is possible to start the process at a predetermined part of the image 117, the display of a range of the image 117 having been processed is changed little by little towards that when the process has been completed, which is preferable because it is possible to confirm how much the process has progressed.

The processing is done in two ways: with and without a variable parameter.

It is assumed here that the process A has a variable parameter. In this case, when such a process is selected, there appears, as shown in FIG. 14B, a screen 110 displaying an image 117, process indication 121 for a process being currently done, select key 122 with an indication of return to a preceding screen (as in FIG. 14A), cancel key 123 for cancellation of the process, variable parameter selector 126 and a set key 127 to set the process.

Figure 14B:
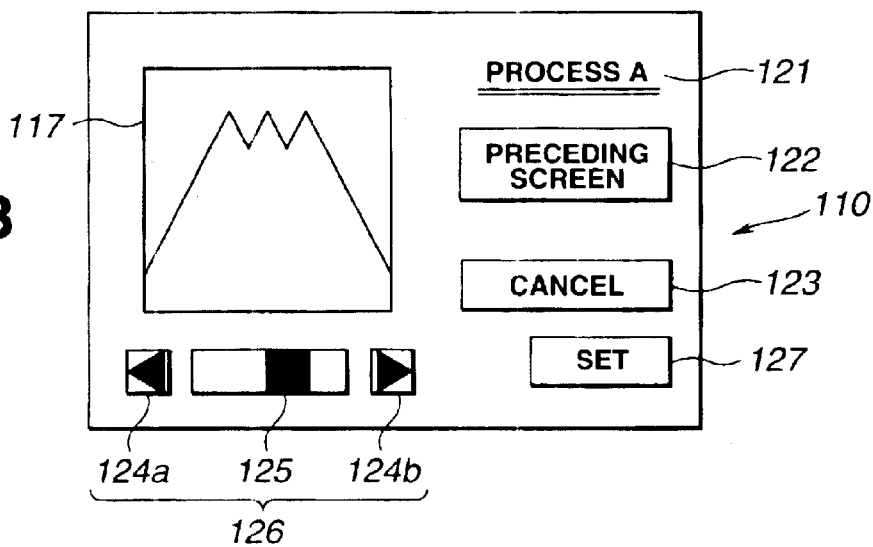

As will be seen from FIG. 14B, the variable parameter selector 126 contains a sliding control indicator 125 to indicate the level of variable parameter, and adjust keys 124a and 124b to adjust variable parameter. Pressing the left adjust key 124a shown in FIG. 14B will cause the variable parameter level to change leftward while pressing the right adjust key 124b will change the variable parameter level rightward. Assume for example that the variable parameter is lightness and the left adjust key 124a in FIG. 14B is assigned to lower the lightness while the right adjust key 124b is assigned to elevate the lightness. By using these adjust keys 124a and 124b to change the parameter level indicated on the sliding control indicator 125, the lightness of an image can be indicated as varied correspondingly.

On the other hand, the process B is assumed to be a process with no variable parameter, for example. In this case, when such a process is selected, there is provided, as shown in FIG. 14C, a screen 110 displaying an image 117, process indication 121 for a process being currently done, select key 122 with an indication of return to a preceding screen (as in FIG. 14A), cancel key 123 for cancellation of the process and a set key 127 to set the process.

Figure 14C:
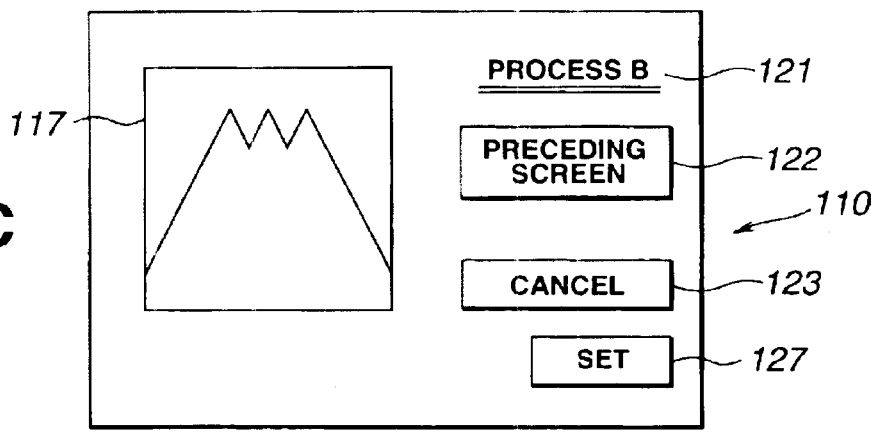

When each process is done using the screens 110 shown in FIGS. 14B and 14C and the user decides to end the process, the user selects the set key 127. For a printing, the user restores the screen as shown in FIG. 14A and selects the print key 119.

The operation of the printer system according to the present invention will be described hereinbelow with reference to FIGS. 15, 16, 17 and 18 being flow charts, respectively. It should be noted that in the following description, only the display device will be referred to as the image display output.

Figure 15:
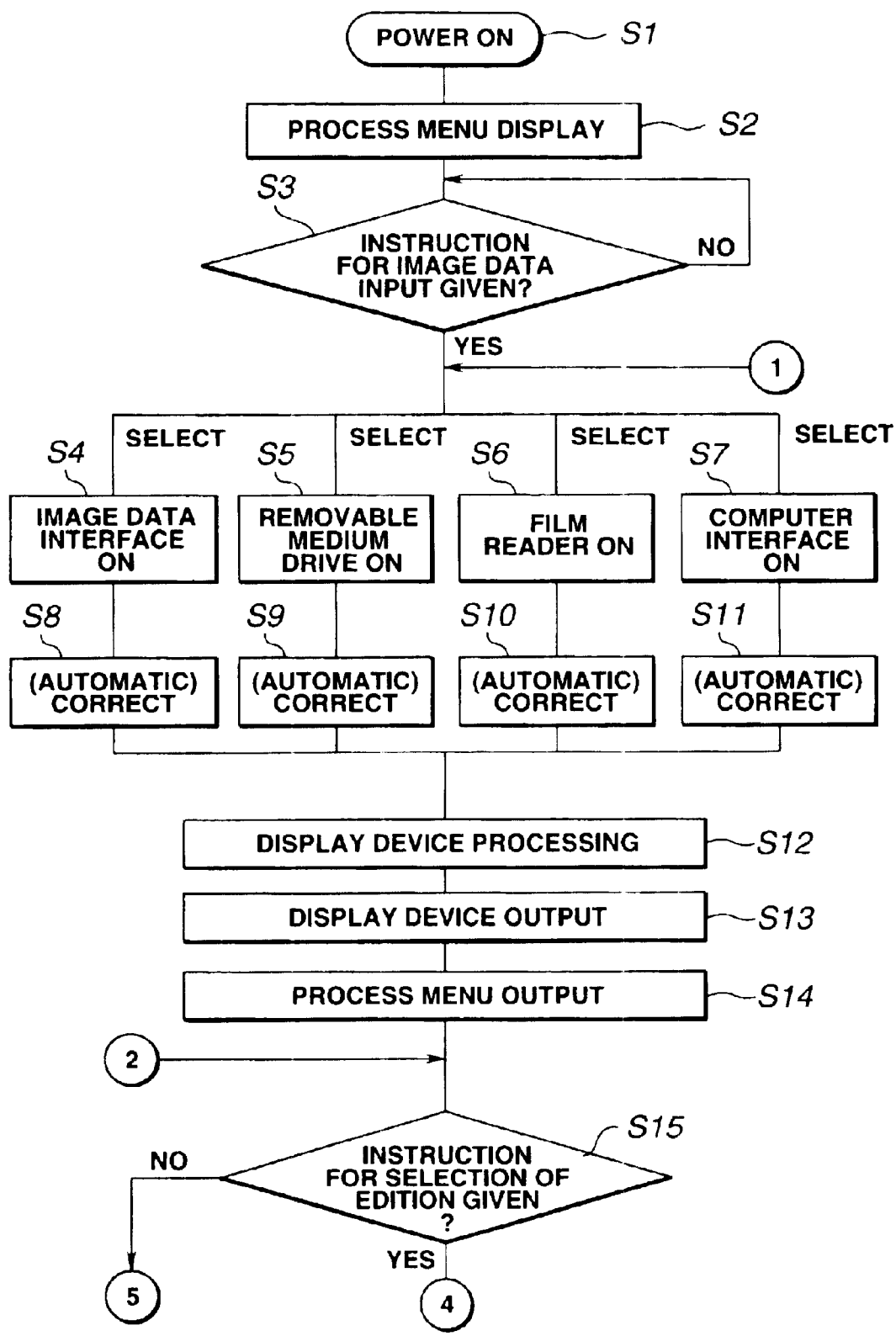
FIG. 15 is a schematic flow chart of a part of operations in the printer system according to the present invention.
Figure 16:
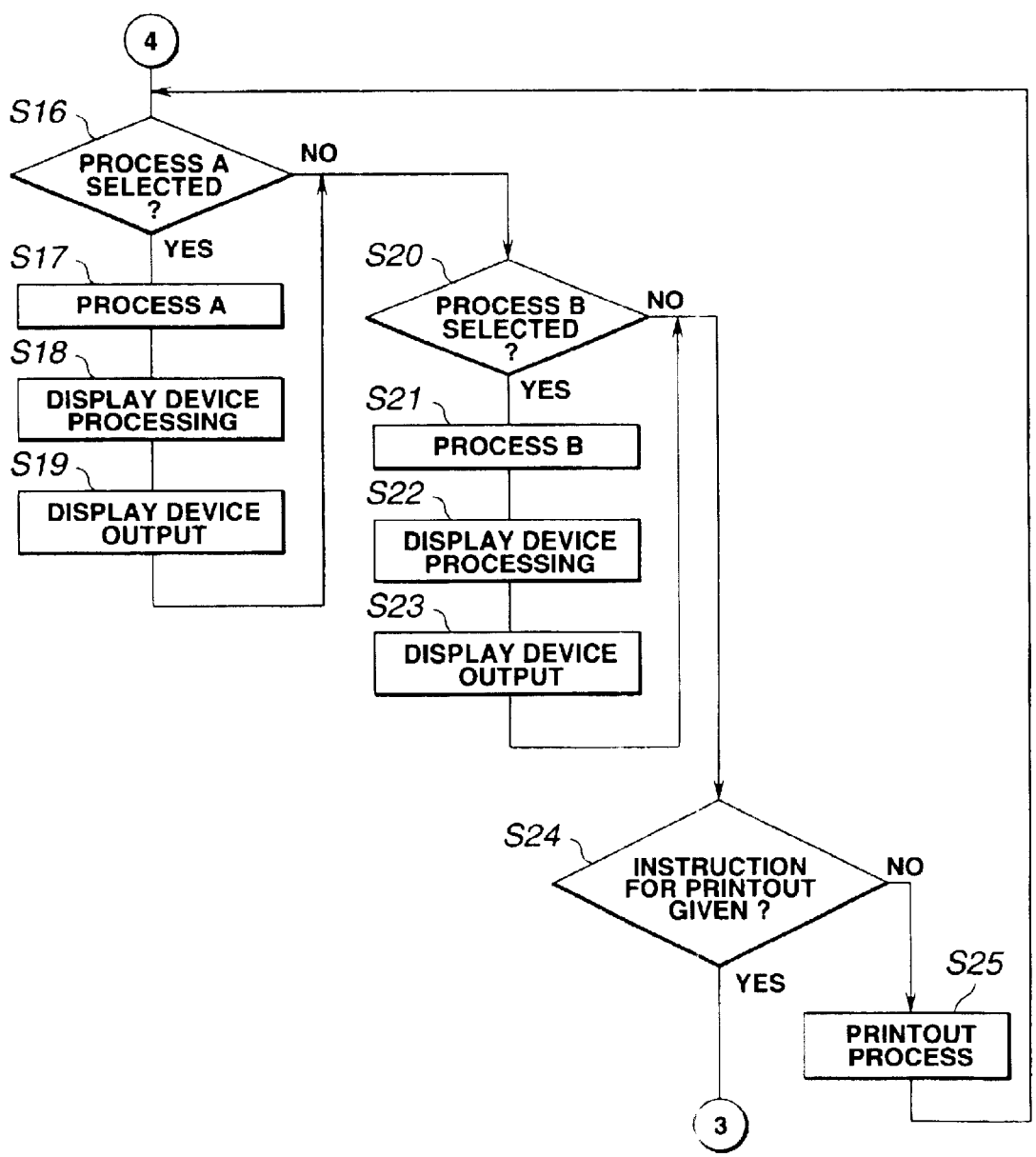
FIG. 16 is a schematic flow chart of a part of operations in the printer system according to the present invention.

First, a process is started at step S1 in FIG. 15. Then, a process menu will be displayed at step S2 as having previously been described with reference to FIG. 13. Next at step S3, it is judged whether an image input means or external input device for input of a digital image data and/or analog image signal is to be selected. A desired one of the image input means and external input device is selected and an instruction is given for input of a digital image data and/or analog image data. Then at step S4, the image data interface is driven for example. As having previously been described, more than one image input means or external input device are used for input of the digital and/or analog image data. First, for example, the removable medium drive is driven at step S5. Then the film reader is driven at step S6, and the computer interface is driven at step S7. That is, the operation goes to any of steps S4 to S7 according to a selection at step S3.

If an image input means or external input device for input of an analog image signal is selected at any of steps S4 to S7, that is, if the image data interface is selected at step S4 and the film reader is selected at step S6 and they are driven, an analog image signal is converted to a digital image data.

On the other hand, if an image input means or external input device for input of image data and/or analog image signal is not selected at step S3 and no instruction for input of an image data and/or analog image signal is given, it is judged at step S3 again whether an image input means or external input device for input of an image data and/or analog image signal is to be selected.

As mentioned above, an image data output from any of the image input device at any of steps S4 to S7 is processed to be handled equally at all steps S8 to S11 to provide a first digital image data. If an input image data has no ideal quality, it is automatically corrected for to have an improved quality. At step S12, a display device processing is done to display the corrected input image data on the display device for example and delivered to the display device at step S13. The image data is thus displayed on the display device. A single input image is edited as it is, and in case a plurality of image data is entered, one of them is selected for edition. At step S14, a process menu as shown in FIG. 14A is displayed. Next, if an instruction for edition of the selected image displayed on the display device is issued at step S15, it is judged at step S16 whether or not the image is to be subjected to the process A. When the execution of the process A is selected, the first digital image data is subjected to the process A at step S17 to produce a second digital image data. The second digital image data is processed at step S18 for display on the display device. At step S19, the processed image data is displayed as an image on the display device.

When the above process is complete, it is judged at step S20 whether or not the second digital image data is to be subjected to the process B. If the execution of the process B is selected, the second digital image data is subjected to the process B is executed at step S21. At step S22, the second digital image data is processed at step S22 for display on the display device. The second digital image data thus re-edited is displayed as an image on the display device at step S23.

After completion of this process, a next process is continuously done as the user desires.

On the other hand, if it is judged at step S16 that the process A is not to be executed, it is judged at step S20 whether the process B is to be executed or not. It is of course that the edition process can be done while skipping such an unnecessary process.

After completion of the predetermined edition process, it is judged at step S24 whether an instruction for printout is to be made or not. At this time, the second digital image data having been completely processed is of course being displayed on the display device.

Here, in the printer system according to the present invention, a printout process for conversion of the image data to a print data is effected at step S25 without selection of a printout instruction.

It should be noted that even if a printout process is being executed at step S25, whether an instruction for an edition exists is detected based on whether the aforementioned interrupt signal has been changed or whether a polling operation is made at each predetermined time. When the edition process are complete, the operation goes back to step S16.

Then, the operation goes back to step S16 where each process is done if necessary. Thereafter, it is judged at step S24 whether the image data is printed. If it is selected to print the image data, a printout process not completed a step S25, there will be effected at step S26 a printout process to be done when edition process are executed again, and a correction process to be done based on printing conditions such as ambient temperature, etc. just before a printing by the print head is done and the image data is printed at step S27, as will be seen from FIG. 17.

Figure 17:
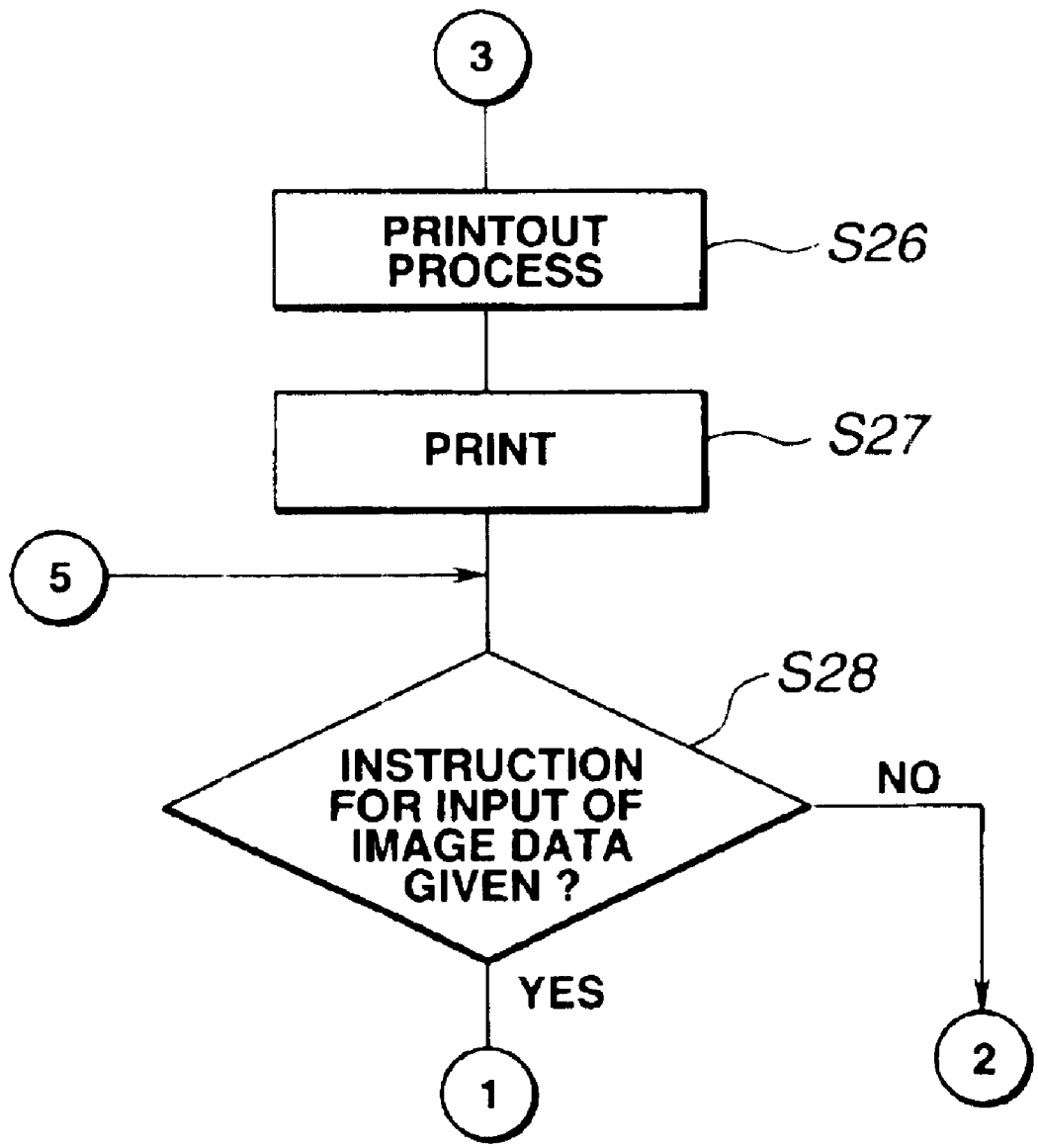
FIG. 17 is a schematic flow chart of a part of operations in the printer system according to the present invention.

That is, if an edition process instruction is issued at step S25 in the middle of a printout process, since the conversion to a print data has not yet completely been done, the printout process is continuously done at step S26 and the image data is printed at step S27, as shown in FIG. 17.

Also, even if no edition process is effected although edition process have been selected at th first process, a printout process for conversion of the first digital image data to a print data is done at step S25. If an instruction for printing is given in the middle of the printout process or in the middle of the printout process at step S25, it is judged at step S24 that the print instruction has been made, the printout process yet to be completed and a correction process based on the printing conditions are effected at step S26, and the image data is printed at step S27.

When the image printing is continued, it is judged at step S27 whether an image input means or external input device for input of an image data is to be selected. If any selection is made at this time, the image data interface is driven at step S4 for example as shown in FIG. 15, and the aforementioned process is continued. If no selection is made at that time, it is made sure at step S15 whether the image data having been subjected to the edition process is to be subjected to edition process again as shown in FIG. 15.

On the other hand, if no instruction has been made for edition process at step S15, the operation goes to step S28 as shown in FIG. 17 to judge whether an image input means or external input device for input of an image data is to be selected.

Figure 18:
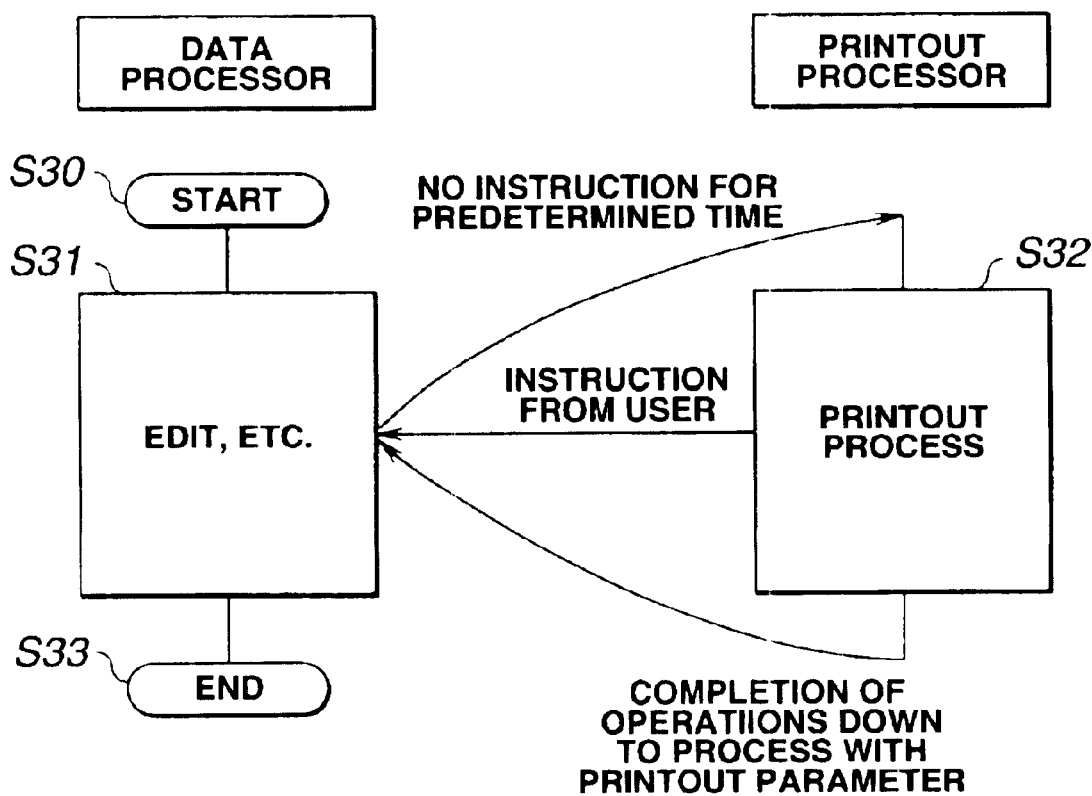
FIG. 18 is a schematic flow chart of a part of operations in the printer system according to the present invention.

In the foregoing, the printout process of an image data having been subjected to various edition processes has been described with reference to the flow charts. FIG. 18 schematically shows flows of operations in a multitasking process including various kinds of control and process and those in a printout process under a process routine based on an interrupt signal. Note that a data processing as shown in FIG. 10 is shown in the left portion of FIG. 18 and a printout process as also shown in FIG. 10 is shown in the right portion of FIG. 18.

The edition process is started at step S30 and effected at step S31. If no next edition process instruction is issued to the data processor or no next printout instruction is issued to the image printer within the predetermined time in the middle of the edition process or even when the edition process are completed, the operation goes to step S32 where a printout process is done to convert the first or second digital image data. If the user gives an edition process in the middle of the printout process, the operation goes back to step S31 where an edition process is done. Also when the printout process is completed, the operation goes back to step S31 where the edition process is terminated. When the edition process is thus over, the operation proceeds to step S33 where the edition process is terminated.

That is to say, in the printer system according to the present invention, since a printout process for conversion of the image data to a print data has been done before an instruction for printing is actually given, the time required for printing is considerably reduced.

The printer system having been described in the foregoing can easily effect various edition processes, requires only a small space for installation, and is easy to operate.

As having been described in the foregoing, in the printer system according to the present invention, a printout process for conversion of a input image data or an image data produced by an edition process of the image data to a print data is effected, and for printing based on the print data, the printout process is started before the printout instruction is issued. If an edition process instruction is issued in the middle of the printout process, the printout process is canceled.

That is, in the printing method and printer system according to the present invention, before the user determines to print out an image data or an edited image data and gives a printout instruction, a conversion of the image data or edited image data to a print data is started. Thus, when the user gives a printout instruction, at least a part of the image data or edited image data has been converted to a print data or a printout process has progressed to a halfway. The time from issuance of a printout instruction until printing in the present invention is considerably shorter than that in the conventional printing method and apparatus in which after start of a printing operation, conversion of an image data to a print data is started. Especially in the printer system according to the present invention, the printout is done for the standby time in the conventional printer system, namely, the processing capability of the printer system according to the present invention is fully utilized.

Also, in the printing method and apparatus according to the present invention, when an edition process instruction is issued in the middle of a printout process, the printout process has already been canceled, so that the printout process will not interfere with the edition process which can thus be effected smoothly.

Especially in the printer system according to the present invention, the controller for the edition processor, printout processor and image printer controls the edition processor and printout processor based on an external instruction and a priority is given to the instruction to the edition processor rather than to that to the printout processor. Thus, the printout process will not interfere with the edition process which can thus be effected smoothly based on an instruction given by the user.

Further, in the printing method and apparatus according to the present invention, if an instruction for edition process or printout is not given within the predetermined time after completion of an image data, the printout process of the image data is started. On the other hand, if such an instruction is issued within the predetermined time after completion of a predetermined edition process of the image data, the printout process of the image data edited by the predetermined edition process is started. Thus, useless printout process can be avoided as much as possible.

Especially, if a next edition precessing instruction is to change a predetermined input operation during the predetermined edition process and and not issued within the predetermined time, namely, within a predetermined time in the middle of a series of edition processes, the printout process of the edited image data is started when the edition process is terminated by the predetermined edition process, that is, in the middle of the edition process. Thus, even if various edition processes are effected, the time from issuance of the printout instruction until the printing is considerably reduced.

What is claimed is:

1. A printing method comprising the steps of:
   receiving input image data;
   effecting a printout process by use of a printout processor to convert to print data the input image data or a data obtained by effecting edition processes of the input image data by use of an edition processor;
   printing out an image based on the print data by use of an image printer, in which a printout process instruction is provided to the Printout processor, before providing a printout instruction to the image printer and before a print instruction is provided by a user, to allow the printout processor to start the printout process; and
   providing automatically the printout processor with a printout process cancel instruction without receiving a separate printout process cancellation request from the user, if an edition process instruction has been provided to the edition processor, to cancel the printout process being done in the printout processor.

2. The method as set forth in claim 1, wherein the printout process for conversion of the image data obtained by the edition process to a print data is started alter a predetermined edition process of the image data is completed and before the printout instruction is given.

3. The method as set forth in claim 1, wherein:
   if the edition or printout process instruction is not given within a predetermined time after completion of the input of image data, the printout process of the image data is started, and
   if the edition process or printout instruction is not given within a predetermined time after completion of the predetermined edition process of image data, the printout process of the image data obtained by the predetermined edition process is started.

4. The method as set forth in claim 3, wherein if a next edition process instruction is to change the predetermined input operation in the middle of the predetermined edition process and the next edition process instruction is not given within the predetermined tine, the printout process of the edited image data is started upon completion of the predetermined edition process.

5. A printer system comprising:
   an image data input in which an analog/digital conversion is effected to convert an external input digital image data and/or analog image signal to a first digital image data;
   an edition processor to edit the first digital image data at least once to provide a second digital image data being an edited image data;

a printout processor to convert the first or second digital image data to print data;

an image printer to print out an image on a recording medium based on the print data; and a controller to control, based on an external instruction, the edition processor, printout processor and the image printer;

the controller providing a printout process instruction to the printout processor, before providing a printout instruction to the image printer and before a print instruction is provided by a user, to allow the printout processor to start the printout process; and the controller automatically providing the printout processor with a printout process cancel instruction without receiving a separate printout process cancellation request from the user, if it has provided an edition process instruction to the edition processor, to cancel the printout process being done in the printout processor.

6. The system as set forth in claim 5, wherein the controller provides the printout processor with a printout process instruction for conversion, to a print data, of the second digital image data edited by the predetermined edition process to allow the printout processor to start the printout process after completion of the predetermined edition process at the edition processor and before the controller provides a printout instruction to the image printer.

7. The printer system as set forth in claim 5, wherein the controller provides the printout processor wit a printout process instruction to allow the printout processor to start a printout process of the first digital image data if the controller has provided no edition process instruction to the edition processor, or if the controller has provided no printout instruction to the printout processor, within a predetermined time after completion of the conversion to the first digital image data in the image data input; and the controller provides the printout processor with the printout process instruction to allow the printout processor to start a printout process of the second digital image data edited by the predetermined edition process when the controller has provided no next edition process instruction to the edition processor, or when the controller has provided no printout instruction to the image printer, within a predetermined time after completion of the predetermined edition process in the edition processor.

8. The printer system as set forth in claim 7, wherein it a next edition process instruction is to change the predetermined input operation in the middle of the predetermined edition process and the next edition process instruction is not given within the predetermined time, namely, if no next edition process instruction is given within the predetermined time while a series of edition processes is being done, the controller provides the printout processor with a printout process instruction to allow the printout processor start the printout process of the edited image data upon completion of the predetermined edition process, that is to say, in the middle of the edition process of the second digital image data.

9. The printer system as set forth in claim 7, wherein a timer or time counter is provided as means for measuring the predetermined time.

10. The printer system as set forth in claim 5, wherein the printout processor comprises at least one of an RGB-CMY converter, color correction circuit, black extraction/background color removal circuit, output gamma correction/gradation correction circuit and a sharpness correction circuit.

11. The printer system as set forth in claim 5, wherein the printout processor further comprises an output characteristic converter to correct ambient temperature, thermal hysteresis and nonuniform printing of the image printer;

the output characteristic converter being adapted to effect any one of the ambient temperature correction, thermal hysteresis correction and nonuniformity correction for the print data after the controller issues a printout instruction to the image printer and before an image is printed out by the image printer.

12. The printer system as set forth in claim 5, wherein the controller controls the edition processor and printout processor in parallel with a priority given to the edition process instruction rather than to the printout process instruction.

13. The printer system as set forth in claim 12, wherein the controller has an operation management circuit to control the edition and printout processors to operate in parallel.

14. The printer system as set forth in claim 13, wherein the operation management circuit detects an edition process instruction from the controller to the edition processor and allows the controller to issue a printout process cancel instruction to the printout processor if the printout processor is in progress of the printout process, thereby canceling the printout process.

15. The printer system as set forth in claim 14, wherein the operation management circuit detects an edition process instruction from the controller based on a change in interrupt signal.

16. The printer system as set forth in claim 14, wherein the operation management circuit detects an edition process instruction from the controller by making a polling operation at each predetermined time.

* * * * *